United States Patent
Bedingfield, Sr. et al.

(10) Patent No.: US 8,406,439 B1
(45) Date of Patent: Mar. 26, 2013

(54) METHODS AND SYSTEMS FOR SYNTHETIC AUDIO PLACEMENT

(75) Inventors: James Carlton Bedingfield, Sr., Lilburn, GA (US); Larry D. Woodring, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1351 days.

(21) Appl. No.: 11/696,510

(22) Filed: Apr. 4, 2007

(51) Int. Cl.
*H04R 5/02* (2006.01)

(52) U.S. Cl. ........................................ 381/310

(58) Field of Classification Search ............... 381/1, 97, 381/17–22, 300, 307, 27, 98, 99, 309, 310, 381/119, 104, 107; 700/94
See application file for complete search history.

(56) References Cited

U.S. PATENT DOCUMENTS

| | | | |
|---|---|---|---|
| 5,930,370 A * | 7/1999 | Ruzicka | 381/18 |
| 6,011,851 A * | 1/2000 | Connor et al. | 381/17 |
| 7,012,630 B2 * | 3/2006 | Curry et al. | 348/14.08 |
| 7,266,207 B2 * | 9/2007 | Wilcock et al. | 381/310 |
| 7,548,854 B2 * | 6/2009 | Roy et al. | 704/226 |
| 7,991,163 B2 * | 8/2011 | Loether | 381/26 |
| 2004/0039464 A1 * | 2/2004 | Virolainen et al. | 700/94 |
| 2006/0034463 A1 * | 2/2006 | Tillotson | 381/1 |

* cited by examiner

*Primary Examiner* — Xu Mei
*Assistant Examiner* — Lun-See Lao
(74) *Attorney, Agent, or Firm* — Myers Bigel Sibley & Sajovec, P.A.

(57) ABSTRACT

Methods and systems for providing synthetic audio placement are described herein. In different aspects, the methods and systems may include a connection port to receive a plurality of remote audio signals included in a conference call, at least one of the plurality of remote audio connections being a single channel audio signal, a processor configured with the connection port to provide a sound field for placing the plurality of audio signals, the sound field providing synthetic audio placement of each of the plurality of remote audio signals, and a rendering output configured with the processor to project the plurality of remote audio within the sound field to a listener.

12 Claims, 16 Drawing Sheets

(Stereo - circular configuration)

(Stereo - circular configuration)

METHODS AND SYSTEMS FOR SYNTHETIC AUDIO PLACEMENT

CROSS REFERENCE TO RELATED APPLICATION

This patent application is related to co-pending, commonly-owned U.S. patent application Ser. No. 11/696,540 entitled "Synthetic Audio Placement", concurrently herewith on Apr. 4, 2007, which application is hereby incorporated by reference.

FIELD OF THE DISCLOSURE

The present disclosure relates to communications, and more specifically to methods and systems for providing synthetic audio placement.

BACKGROUND

Conferences are often conducted with multiple participants. A conference will typically include a number of different speakers throughout the duration of the conference. When attending a conference in person, a participant has the luxury of utilizing sensory information, including vision and the timbre effect of sound, to determine helpful information about the speaker. Unfortunately, face-to-face conferences are not always possible due to geographical or other constraints. Therefore, many conferences occur over communication systems, such as telephone systems configured for conference calling, or video conference systems.

Many communication systems are limited to transmitting single channel audio signals between users. Therefore, when conferences occur over typical communication systems, spatial reference is often lost through the single channel communication. It is often difficult to determine which participant is speaking during a conference call when multiple participants sound similar or when there are a large number of participants on the conference call.

Conference calls may also be less desirable than in-person conferences for other reasons. For example, during in-person conferences a participant can direct his attention (or focus) to a speaker by turning his head, and thus receive sound from the speaker evenly through both ears. This "natural focusing" often allows a person to hear the speaker better, including times when other participants are talking.

SUMMARY

Methods and systems for providing synthetic audio placement are described herein. In different aspects, the methods and systems may include receiving an incoming signal over an audio connection, the incoming signal including audio input from a plurality of audio sources, and further not including information regarding relative positions of the plurality of audio sources. Additionally, the methods and systems may include synthesizing a sound field having a synthetic position associated with each of the plurality of audio sources relative to a listener and processing a portion of the incoming signal. Processing a portion of the incoming signal may include determining which of the plurality of audio sources provided the portion of the incoming signal; determining the synthetic position associated with the providing audio source; generating a synthetic audio signal based on the portion of the incoming signal and the determined synthetic position of the providing audio source, the synthetic audio signal being configured to at least partially provide the listener with a sense of having a relative position with respect to the providing audio source; and emitting the synthetic audio signal to the listener.

Additional methods and systems for providing synthetic audio placement are described herein. In different aspects, the methods and systems may include a connection port to receive a plurality of remote audio signals included in a conference call, at least one of the plurality of remote audio connections being a single channel audio signal, a processor configured with the connection port to provide a sound field for placing the plurality of audio signals, the sound field providing synthetic audio placement of each of the plurality of remote audio signals, and a rendering output configured with the processor to project the plurality of remote audio within the sound field to a listener.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The teachings herein are described with reference to the accompanying figures.

Figures 19A, 19B, 19C:
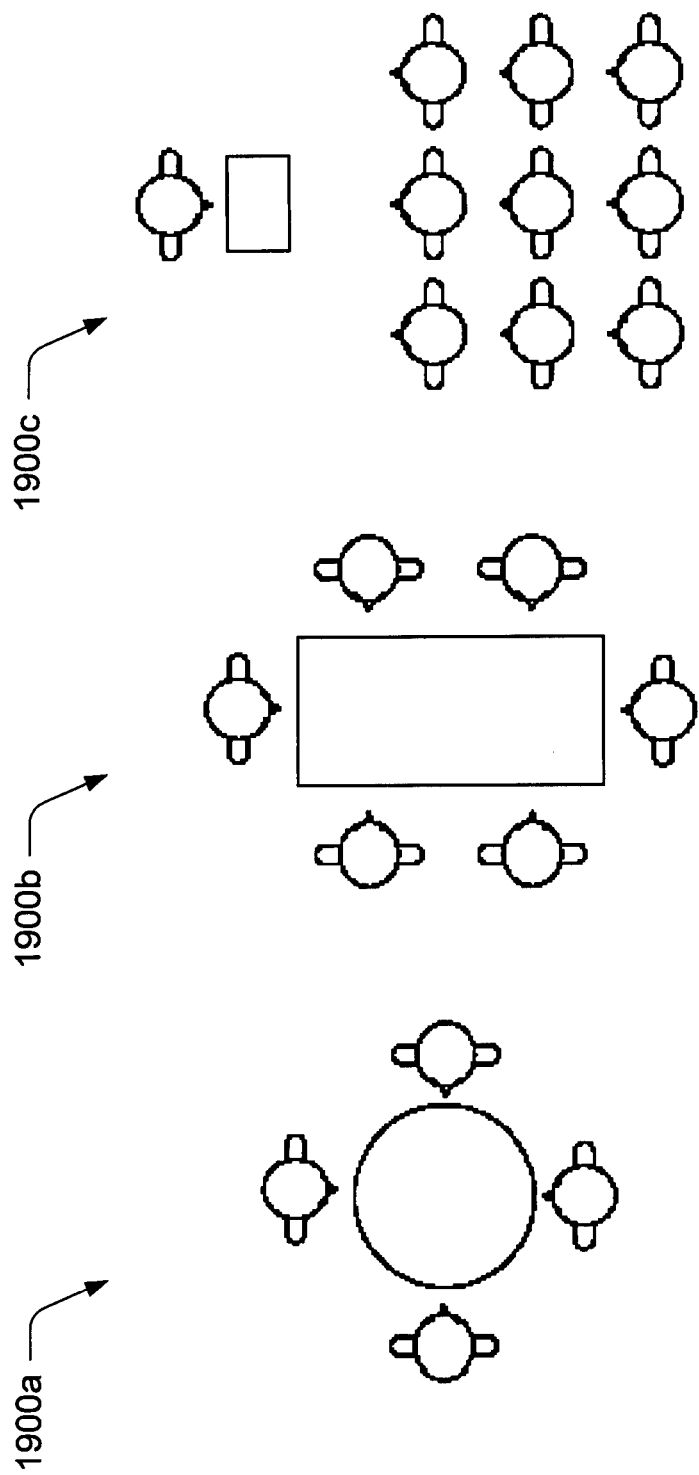

FIGS. 19a, 19b, and 19c are schematics of sample default configurations for a listener and participants within a sound field, more specifically, FIG. 19a is a schematic of a circular sound field, FIG. 19b is a schematic of a polygon sound field, and FIG. 19c is a schematic of presentation sound field.

Figure 20:
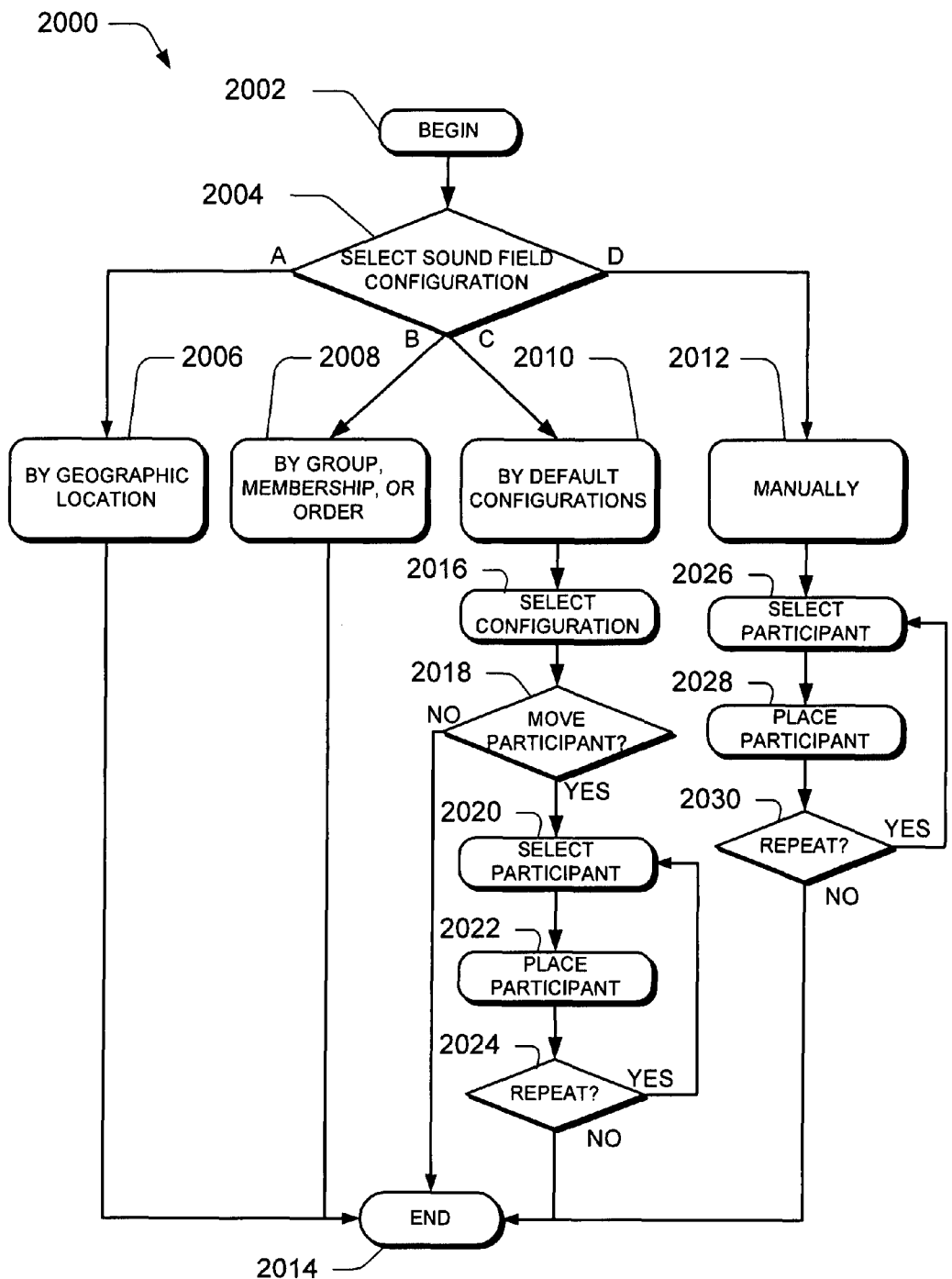

FIG. 20 is a block diagram of an exemplary method of placing participants within a sound field using synthetic audio placement.

DETAILED DESCRIPTION

An improved telephone or network-based communication system may more closely simulate an in-person conference setting. For example, a communication system may provide multi-channel sound to a listener by modifying a single channel signal provided by another participant's system. To further enhance the listener's experience, the communication system may assign each participant a virtual position within a virtual sound field. Each participant is heard by the listener in multi-channel audio based on the participant's virtual location in the sound field.

One way the human hearing mechanism (including the ears, nerves and brain processing, subsequently referred to as "the ear") detects placement of a speaker (or source of sound) is by detecting the relative volume perceived by the listener's two ears. A sound whose volume is stronger in the left ear appears to be coming from a position to the left of the listener. This "stereo effect" is used advantageously in nearly all modern music reproduction systems, and allows the creator of the music to "position" instruments left-to-right across the listener's virtual "sound field." Another way the placement of a sound source is determined is by relative volume. A signal of lower volume sounds farther away than a signal of higher volume. Combined with the stereo effect, volume settings allow for "near-left or far-right" positioning of a sound source. A third way the human ear detects the position of a signal is a change in frequencies heard as a sound moves from the front of a listener's ear, where most frequencies are received with equal strength, to a position behind the listener's ear, where the higher frequencies are attenuated and the lower frequencies seem more apparent. In a virtual environment, this effect, combined with a decrease in volume and left-right positioning, may give the listener the impression that a sound source has moved "behind" the listener, even with a two channel stereo system. Additionally, changes to delay and echo may heighten this effect. Further, other parameter changes may provide the sensation that one participant is located behind another participant.

In an example, a sound field may include four participants configured in a circular configuration. With respect to a listener equipped with a multi-channel audio communication system, the listener may focus on a first speaker located at the 12 o'clock position relative to the listener and hear the speaker in stereo sound with both the right and left audio channels delivering substantially even volume levels. The listener may hear a second speaker, located at the 3 o'clock position relative to the listener, in stereo sound with an increased volume level in the right audio channel and a decreased volume level in the left audio channel, as compared to the right and left volume levels received from the first speaker. Therefore, the multi-channel audio communication system may render single channel sound detected by a speaker's microphone into a synthetic audio placement allowing a listener to sense the location (within the sound field) of the speaker through the modified audio signal presented to the listener.

Methods and systems for providing synthetic audio placement are described herein. Many specific details of certain embodiments are set forth in the following description and in FIGS. 1 through 16 to provide a thorough understanding of such embodiments.

Figure 1:
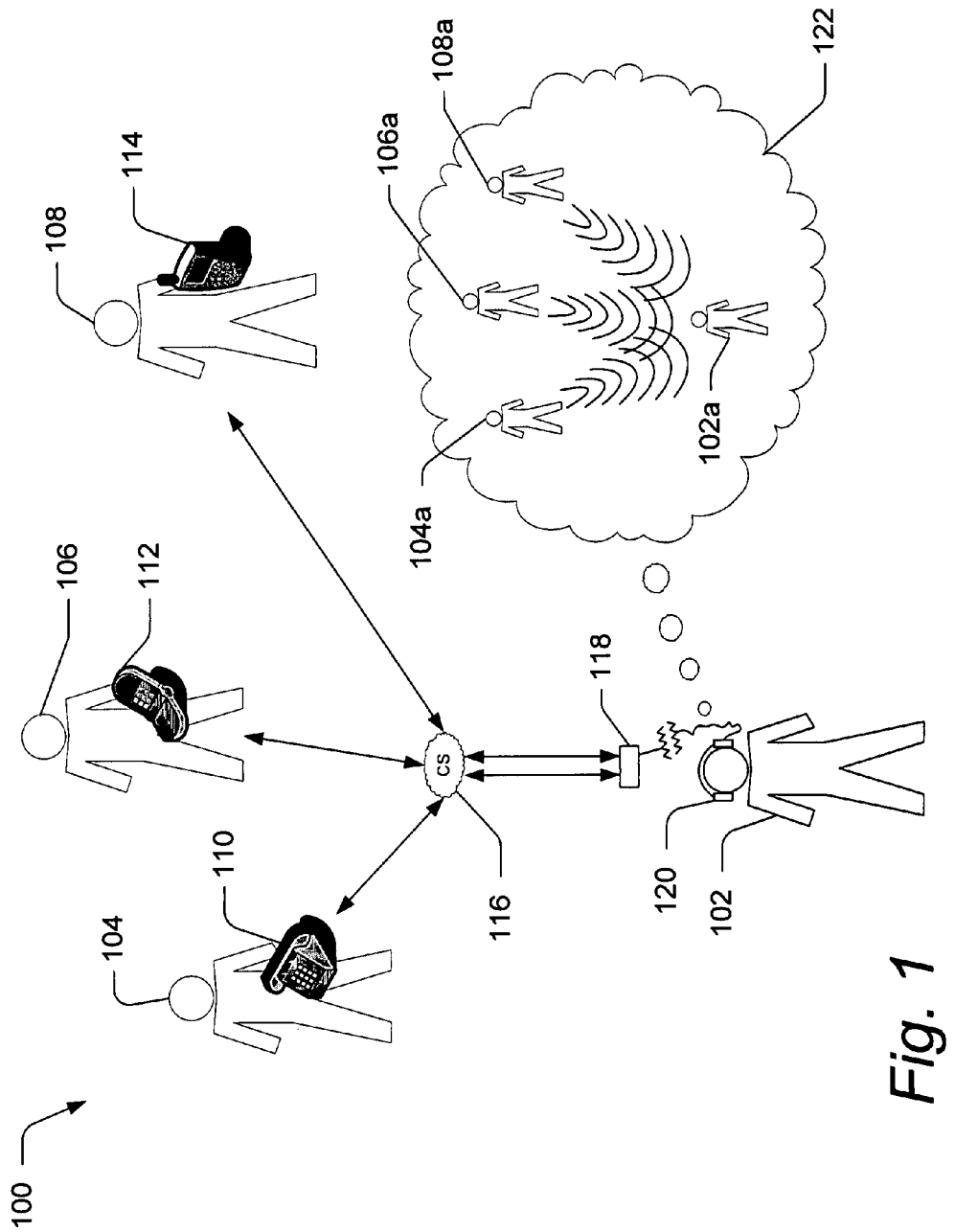
FIG. 1 is a schematic of an overall environment in which methods and systems of synthetic audio placement may be organized.

FIG. 1 illustrates an overall environment 100 for providing a synthetic audio placement to a listener 102. The environment 100 includes a number of participants, such as participants 104, 106, and 108. Although the environment only depicts three participants 104, 106, 108, any number of participants may be in connection with the listener 102. Each participant 104, 106, 108 may have a communication device 110, 112, 114, respectively. The communication devices 110, 112, 114 may be telephones, wireless phones, mobile phones, two-way voice devices, walkie-talkies, voice-over-IP (VoIP) devices, microphones, or other communication devices that permit multi-directional communication over a communication system 116.

The listener 102, who may also be a speaker and participant, may have a multi-channel processing device 118 and a multi-channel speaker system 120. The multi-channel processing device 118 may receive a series of signals from the communication system 116, process the signals, and output the signals to the multi-channel speaker system 120. For example, in some embodiments the multi-channel processing device 118 may receive a single channel signal from a speaking participant's communication device, such as participant's 104 communication device 110. The multi-channel processing device 118 may separate the single channel audio signal into a multi-channel signal, thus creating a sound field 122 for the listener 102 when the listener hears the audio signal from the multi-channel processing device 118, and then through the speaker system 120. In other embodiments, the communication system 116 may provide a two-channel, or multi-channel signal, to the multi-channel processing device 118. In these embodiments, the multi-channel processing device 118 may output the audio signals directly to the multi-channel speaker system 120 to enable the listener 102 to hear the speaking participant in the sound field 122.

The sound field 122 shown in FIG. 1 represents the perception resulting from the audio output of the multi-channel processing device 118 through the multi-channel speaker system 120 as heard by the listener 102. For example, if a listener 102a and participants 104a, 106a, 108a were in the same location and speaking to each other directly (without the communication system 116), then the listener 102a would hear sounds from the participants 104a, 106a, 108a through both of the listener's 102a ears, and thus have a specific balance, volume, and timbre for each speaker. In the environment 100, the user 102 receives audio from the participants 104, 106, 108 through a communication system 116 in a substantially similar (or approximately similar) manner as if the listener was present between all participants 104, 106, 108. The multi-channel processing device 118 configured with the communication system 116 creates the sound field 122 that is substantially similar (or approximately similar) to an actual sound field where the listener 102 is present between all of participants 104, 106, 108.

Figure 2:
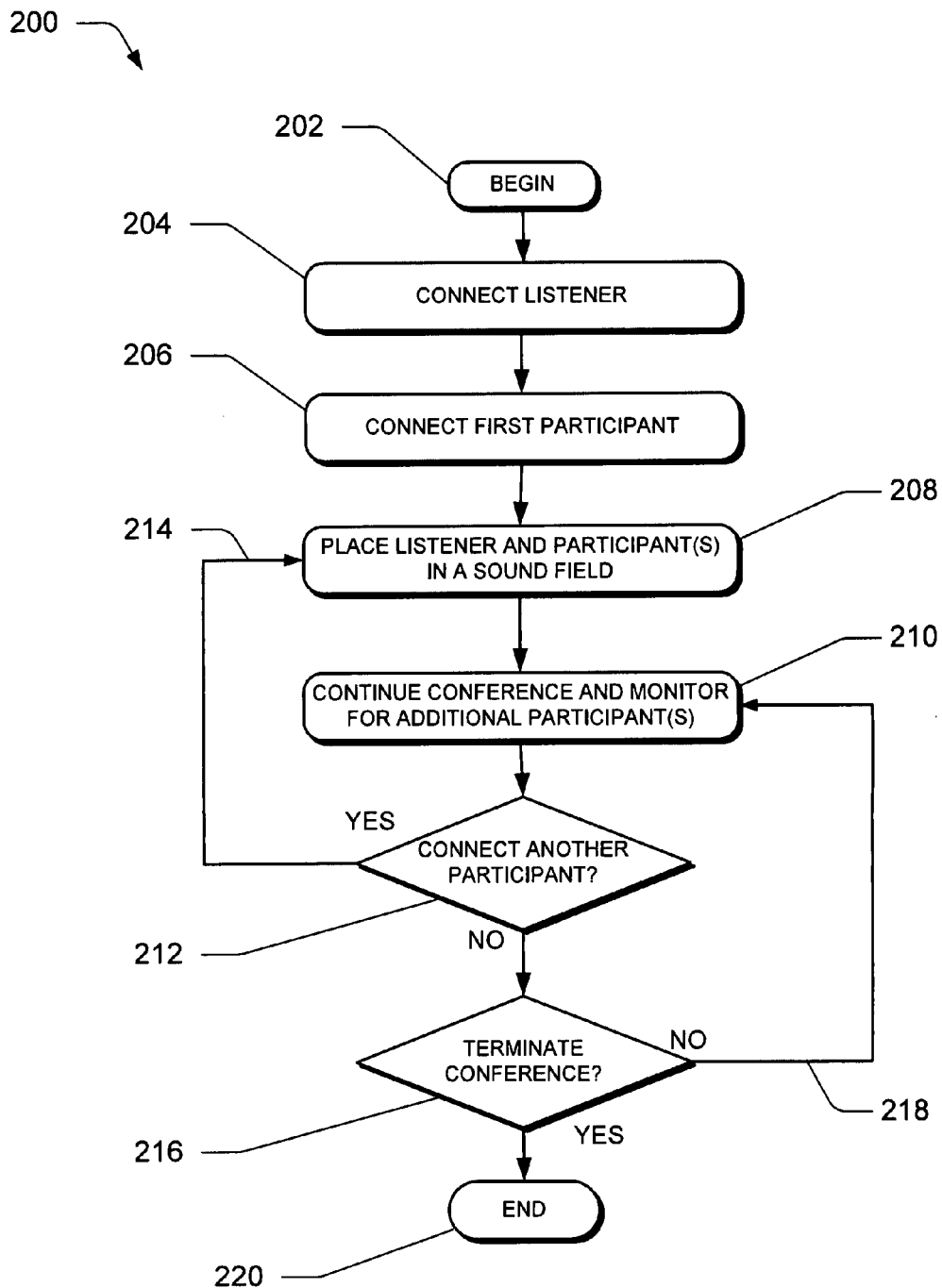
FIG. 2 is a block diagram of methods or systems for providing synthetic audio placement and how participants may be connected to one another.

FIG. 2 is a block diagram of a method 200 for providing synthetic audio placement and how participants may be connected to one another. At a block 202, the method 200 begins. At a block 204, a listener is connected. At a block 206, a first participant is connected with the listener from the block 204. For example, the listener 102 is connected to the participant 104 as shown in FIG. 1.

At a block 208, the listener and participant are placed in a sound field providing synthetic audio placement. In this situation, the conference would only include one participant, such as the participant 104, and the listener 102. Therefore, only a simple sound field may be necessary. At a block 210, the conference is continued and monitored for additional participants. At a decision block 212, the method 200 determines whether to add another participant to the conference. If another participant is added, then the method 200 continues via a route 214 to place the added participant in the sound field with the listener and other participant(s) at the block 208. If no additional participants are added at the decision block 212, then the method advances to a decision block 216.

When a second participant is connected, such as after the decision block 212 proceeds via the route 214 to place a second participant at the block 208, the two participants are placed in the sound field with the listener. Therefore, the listener may hear the first participant, such as participant 104, as if the first participant is located on the left side of the sound field and the second participant, such as participant 106, as if the second participant is located on the right side of the sound field. Additional participants may be added to the sound field by distributing the participants in any number of positions within the sound field. For example, the participants may be placed in a circular configuration within the sound field. In other embodiments, the participants may be placed in other configurations within the sound field such as in a rectangular configuration or along a linear axis, using various audio techniques such as volume, balance, parametric equalization, delay, echo and the like to produce the effects described above with reference to FIG. 1. In yet other embodiments, the participants may be placed in a position relative to their known geographic location.

At the decision block 216, the method 200 determines if the conference should be terminated. If the conference is not terminated, then the method 200 continues via a route 218 to the block 210 and the conference is continued. If the conference is to be terminated, then the method advances to a block 220 and the conference ends. Additionally, participants may be removed from the conference utilizing a similar process.

Figure 3:
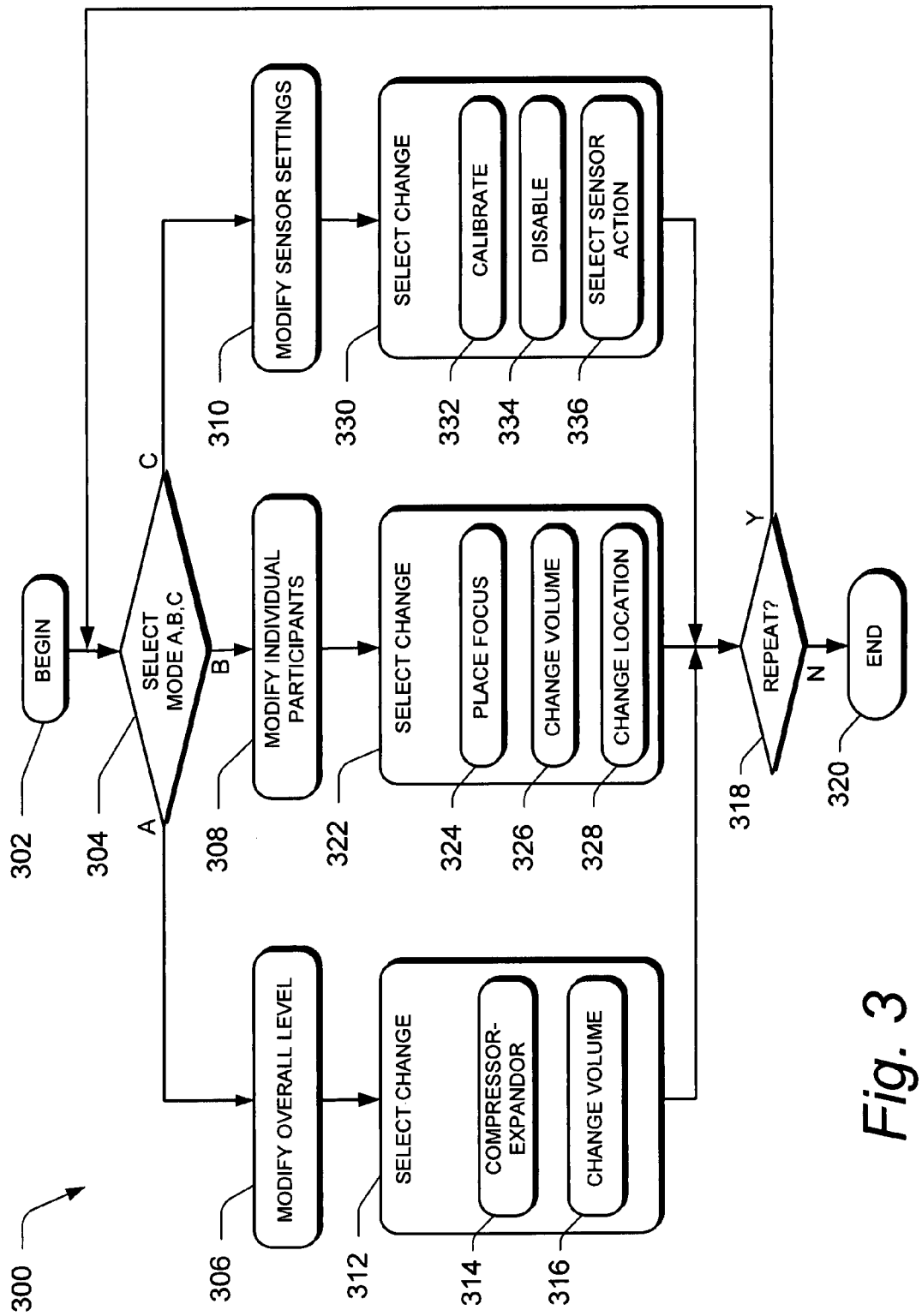
FIG. 3 is a block diagram of an overall environment in which methods and systems of synthetic audio placement may be organized, including selections that may be available to a listener in such an environment.

FIG. 3 is a block diagram of a method 300 of how synthetic audio placement may be organized, including selections a listener may make in such an environment. For example, the listener may make selections on the multi-channel processing device 118. At a block 302, the method 300 begins. At a decision block 304, a listener selects a mode via routes A, B, or C. The selection modes may include modifying an overall audio level of the participants at a block 306, modifying individual participants at a block 308, and modifying sensor settings at a block 310. Each mode will be explained below in detail.

From the decision block 304, the listener may select the mode for modifying the overall level via route A at the block 306. At a selection block 312, the listener may select a setting, such as to implement compressor-expandor functionality at a block 314 or to change the volume at a block 316. According to exemplary embodiments, the compressor-expandor functionality at the block 314 dynamically changes the volume of the participants to proportionally level sounds from any participant that is either above or below the threshold volume levels. This function may be performed by the multi-channel processing device 118. Therefore, when the listener selects the compressor-expandor functionality at the block 314, the volume of the participants is proportionally leveled so that any single participant is not much louder or fainter than the rest of the participants. However, participants' voices or other audio may still fluctuate after leveling the volume. If the listener selects to change the volume at the block 316, the listener may adjust aspects of the sound for all of the participants. In some embodiments, the change volume at the block 316 may also include equalization controls (e.g., bass and treble, and more complex characteristics controls), digital delay controls, echo controls, and other audio controls to adjust the sound output of all of the participants.

After the setting is selected at the selection block 312 and a setting is selected and implemented at the blocks 314 or 316, the method 300 advances to a decision block 318 to determine if additional changes should be made (i.e., the method 300 may repeat). If the listener selects to repeat the method 300 at the decision block 318, then the method is routed to the decision block 304. If the listener does not select to repeat the method 300 at the decision block 318, then the method is advanced to a block 320 and the method ends.

From the decision block 304, the listener may select the mode for modifying individual participants via route B at the block 308. At a selection block 322, the listener may select a setting, such as to place the focus at a block 324, to change a participant's volume at a block 326, or to change a participant's location at a block 328. If the listener selects to place the focus at the block 324, the listener then selects a participant for the focus (the focus object). The focus object's volume may then be amplified above the volume level of the other participants. For example, when multiple participants are speaking during a conference, the listener may desire to place the focus on the participant the listener desires to hear above the other speaking participants. If the listener selects to change the volume at the block 326, the listener may select a participant and adjust the volume, or other aspects of the participants sound such as the aspects adjustable by the block 316. If the listener selects to change the location at the block 328, the listener selects a participant and then selects a new location for the participant within the sound field. The listener may also relocate his position within the sound field at the block 328. After the setting is selected at the selection block 322 and a setting is selected and implemented at the blocks 324, 326 or 328, the method 300 advances to the decision block 318 and then to either the decision block 304 or the block 320 as described above.

From the decision block 304, the listener may select the mode for modifying sensor settings via route C at the block 310. A sensor may be provided to allow a user to control the orientation, focus, or other aspects of the rendering of the sound field, such as by sensing the movements of the listener and then changing the sound field or audio output according to the sensor-collected information. At a selection block 330, the listener may select a setting, such as calibrate at a block 332, disable at a block 334, or select sensor action at a block 336. If the listener selects to calibrate at the block 324, the listener is able to adjust the system sensitivity to match the current sensor and environment. If the listener selects to disable a sensor at the block 334, the listener may select a sensor to disable. Additionally, the listener may be able to configure or select other sensors at the block 334. If the listener selects to change the sensor action at the block 336, the listener may then modify the orientation of the sound field with respect to the listener's orientation, amplify the output of the participant the listener is turned toward, or both of these options. After the setting is selected at the selection block 330 and a setting is selected and implemented at the blocks 332, 334 or 336, the method 300 advances to the decision block 318 and then to either the decision block 304 or the block 320 as described above.

Figure 4:
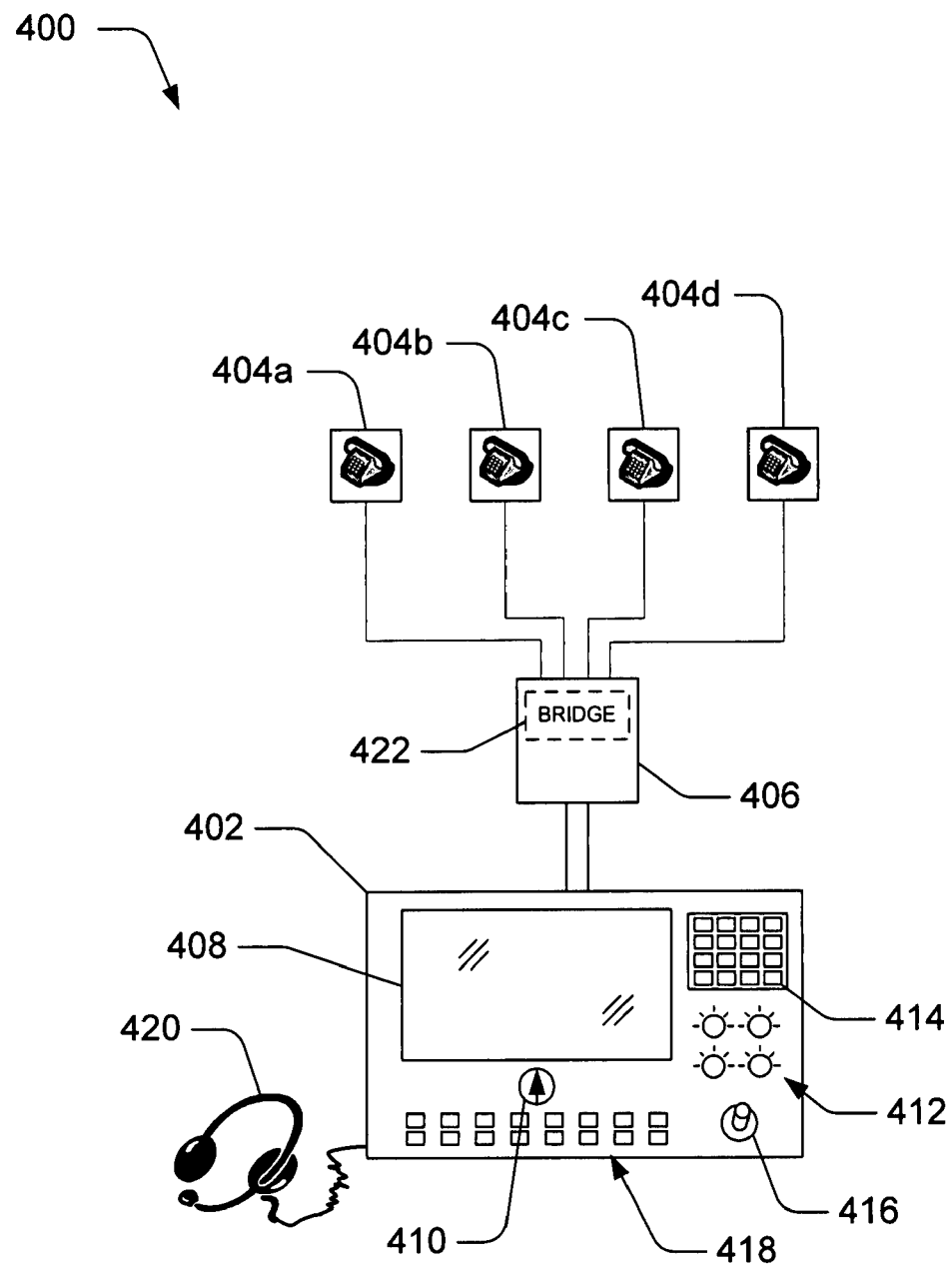
FIG. 4 is a schematic of systems for providing synthetic audio placement and how a system may be organized.

FIG. 4 is an exemplary schematic of a system 400 for providing or controlling synthetic audio placement. The system 400 includes a processing device 402 operatively connected with participants 404a-404d through a communication system 406. The processing device 402 may include a display 408, a focus controller 410, dial adjusters 412, numeric keys 414, a joystick 416, and other input devices 418. In some embodiments, the display 408 may include information relating to a conference connection, speakers, input settings, and other relevant information. In additional embodiments, the display 408 may enable touch screen entry of information, such as configuration selections, participant names or titles, and the like.

The focus controller 410 may allow a listener, such as the listener 102, to select a participant for which to change the focus or orientation of the sound field and make other modifications to the audio signal. For example, the listener 102 may turn the focus controller 410 to selectively adjust the focus between different participants. In some embodiments, the dial adjusters 412, the numeric keys 414, the joystick 416, and the other input devices 418 may be utilized individually or in combination to selectively adjust components described above in the method 300. The dial adjusters 412, the numeric keys 414, the joystick 416, and the other input devices 418 may also be utilized to locate the participants 404a-404d within a sound field. For example, the joystick 416 may be utilized to selectively locate a participant, such as the participant 404a, in a position within the sound field as desired by the listener by utilizing the controls on the processing device 402. The participants 404a-404d may also be automatically placed within the sound field, as will be further discussed below.

The processing device 402 includes an audio output 420, such as stereo speakers configured as a headset. In other embodiments, other combinations of speakers may be utilized.

The communication system 406 may be network based, such as a voice-over IP network, ISDN network, or other network based communication system including those utilizing computer networks and the Internet. In other embodiments, the communication system 406 may be a telecommunication system. In additional embodiments, the communication system 406 may combine aspects of both network based communications systems and telecommunication systems. The communication system 406 may include a communication bridge 422 capable of performing synthetic audio placement functions. The communication bridge 422 may receive multi-channel inputs from a plurality of participants, such as the participants 404a-404d. The communication bridge 422 may then output a modified signal to the processing device 402. In other embodiments, the multi-channel inputs from a plurality of participants may directly connect to the processing device 402. The communications bridge 422, similar to existing conference bridges, may support administrative access to manage conference reservations, default preferences, user authentication and authorization, and similar management functions. These functions may be provided with multiple administrative levels to allow appropriate management by service providers, enterprises, and individual users.

The processing device 402 may be used in other embodiments. The processing device 402 may actually provide the synthetic audio placement processing by receiving all signals from all participants, either separately or in multiplexed, multi-channel, or specially encoded format. In this embodiment, both the control and the signal processing may take place in the processing device 402. Alternatively, the processing device 402 may serve as a remote control for a separately-located synthetic audio placement bridge circuit, as indicated by the communications bridge 422. In this embodiment, the connectivity to the processing device 402 includes a control channel, over which the processing device 402 and the communications bridge 422 may exchange control signals, and a signal channel, over which the listener may receive the two or more audio channels containing all of the participant audio, arranged in synthetic audio placement format as determined by the system 400. Further embodiments of the conference bridge are discussed in greater detail below.

Figure 4A:
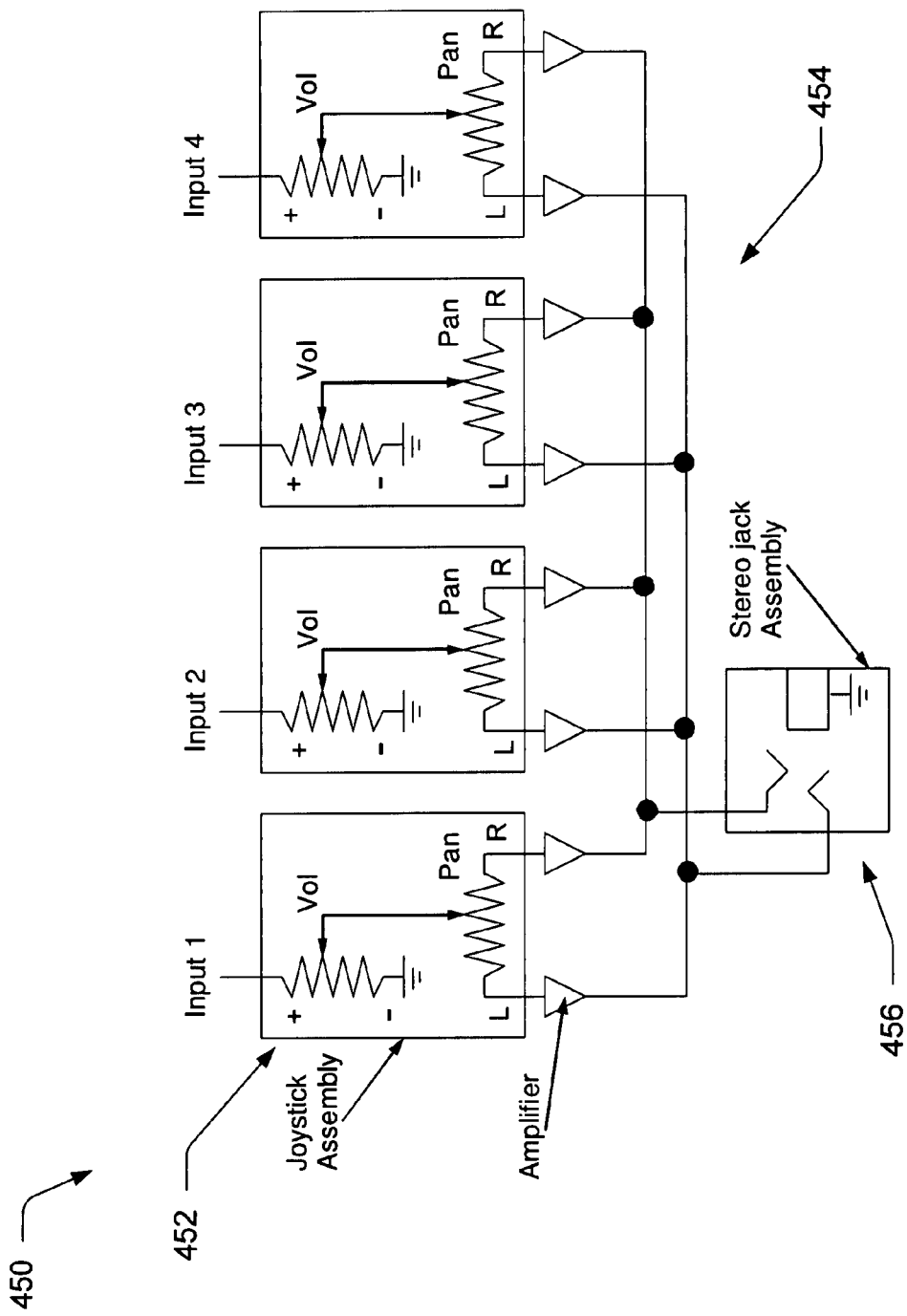
FIG. 4a is a schematic view of an exemplary analog synthetic audio placement bridge.

FIG. 4a is an exemplary embodiment of an analog synthetic audio placement bridge 450. The bridge may include aspects of the processing device 402 and the communications bridge 422. The bridge 450 may include any number of inputs 452. The input 452 may include a joystick control to adjust the volume and left/right channel allocation of the single channel input as outputted in stereo sound (e.g., left/right). A bus 454 may include a left bus and a right bus for stereo separation provided by the input 452. The bus 454 is in connection to a stereo jack assembly 456 that enables a listener to hear synthetic audio placement of any participant connected to the bridge 450 through the inputs 452.

Figure 5:
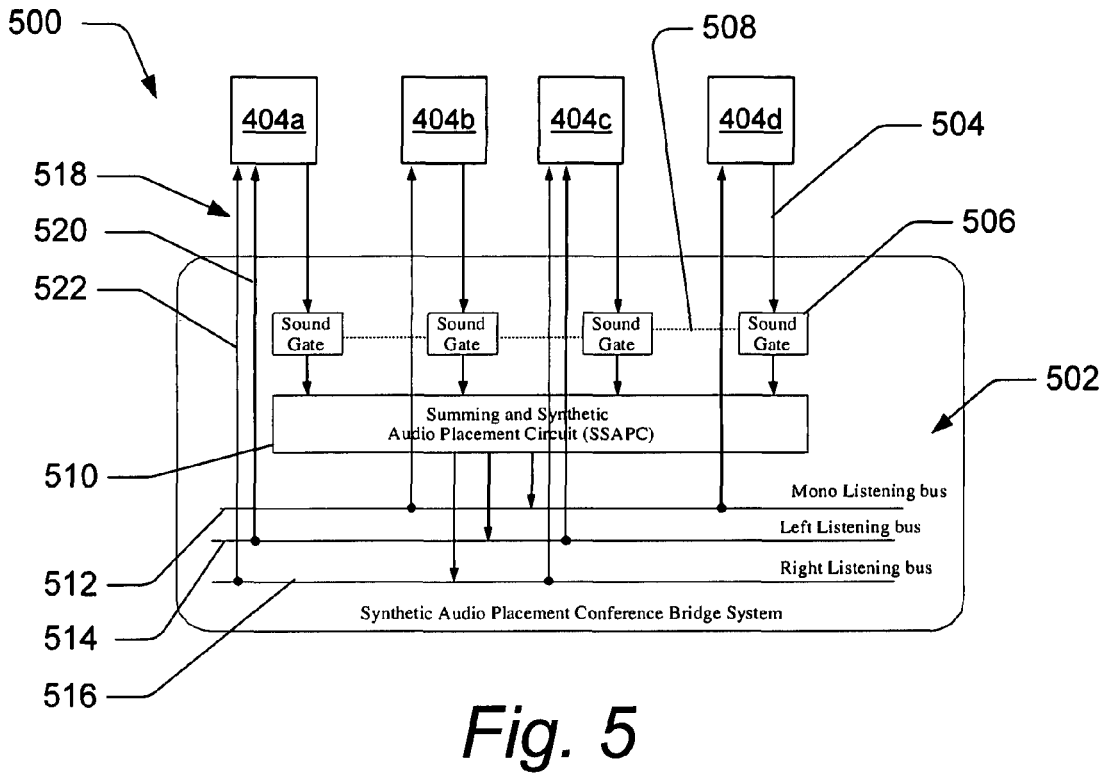
FIG. 5 is a schematic view of a conference bridge for providing synthetic audio placement and how the conference bridge may be organized.

FIG. 5 is a schematic view of a synthetic audio placement conference bridge 500. The conference bridge 500 answers calls (answering circuits not shown) and connects each participant 404a-404d to a listening bus 502. Each participant's 404a-404d sound signals travel along a speech path 504 that goes through a sound gate 506 to prevent extraneous noises (e.g., breathing) from being amplified. The sound gates 504 may also be in connection via a link 508 so that only the strongest signal is heard. A summing and Synthetic Audio Placement Circuit (SSAPC) 510 receives the sound signals from each participant 404a-404d, combines the signals, and then sends the combined signals back to each participant 404a-404d. Although only four participants 404a-404d are shown, any number of participants may be supported.

The SSAPC 510 may be configured to arrange the participants 404a-404d in a synthetic audio placement, using the left and right channels to provide stereo separation. The listening bus 502 may include a mono listening bus 512, a left listening bus 514, and a right listening bus 516. In FIG. 5, a stereo signal is provided to participants 404a and 404c which are connected to the left and right listening bus 514, 516. For example, participants 404a and 404c may have access to the stereo signal because they have paid for premium service or simply because they possess the necessary equipment to enable stereo sound. The participants 404b and 404d receive a single channel signal, and thus may be connected to the mono listening bus 512. The single channel signal may be the same signal they would receive using a conventional bridge without synthetic audio placement. Different participant status or access may be achieved in many ways, such as by providing different dial-in numbers, different PIN numbers, or even by asking the participant if they want mono or stereo during a conference bridge login process.

To utilize the capabilities of the SSAPC 510, participants 404a and 404c may have two or more receiving circuit paths 518. As shown in FIG. 5, a left receiving path 520 and a right receiving path 522 may enable participant 404a to receive stereo sound from another participant, such as participant 404b, through the SSAPC 510. Since stereo configuration is not a typical telephone capability, it may be accomplished by ordering two regular phone lines and combining them with the appropriate customer premises equipment (CPE), using multi-channel capability of an ISDN or VoIP phone system to send stereo signals to the participants 404a-404d, or by other means utilizing customized systems. Additionally, a multi-channel capability may be simulated utilizing a single channel line and then instantiating the signals on the listener's CPE in multiplexed or encoded format.

Table 1, provided immediately below, shows one set of arrangements for a number of conference bridge participants (or users) ranging from 2 to 10 participants. The distribution provided by this table may be implemented in the SSAPC 510. As the number of participants increase, the placement of the participants may vary, just as the arrangement of speakers around a circular conference table might vary as additional participants join. Table 1 provides one of many possible configurations of participants in a synthetic audio placement system. Other placements are contemplated and remain within the spirit and scope of the disclosure.

is configured to provide a separate output mix 704a, 704b, 704c, and 704d for each participant 404a-404d, respectively. The SSAPC 702 includes the separate listening bus configuration, such as 502 in FIG. 5, for each participant to provide the separate output mix 704a-704d. The SSAPC 702 may provide more complete control of the placement of the participants 404a-404d in the sound field.

Figure 6:
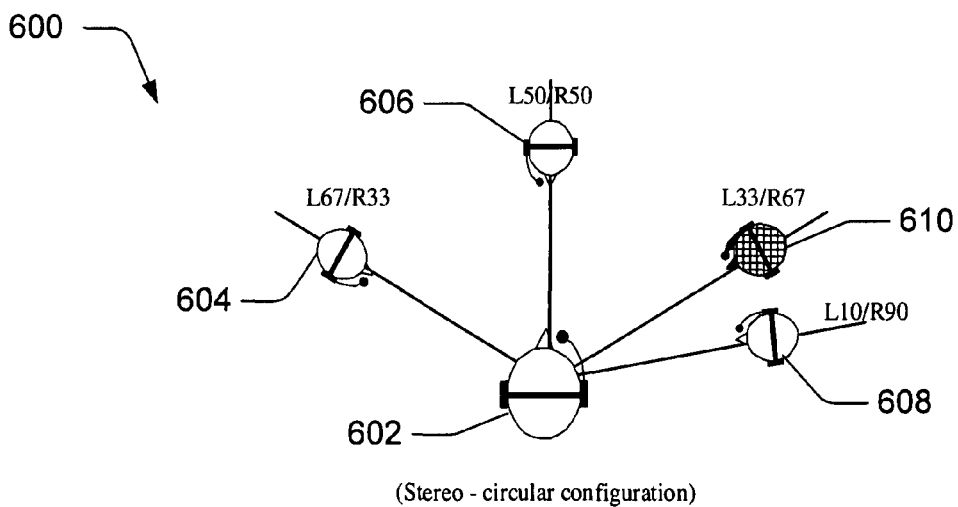
FIG. 6 is a schematic view of a group of participants surrounding a listener, utilizing the conference bridge of FIG. 5.
Figure 8:
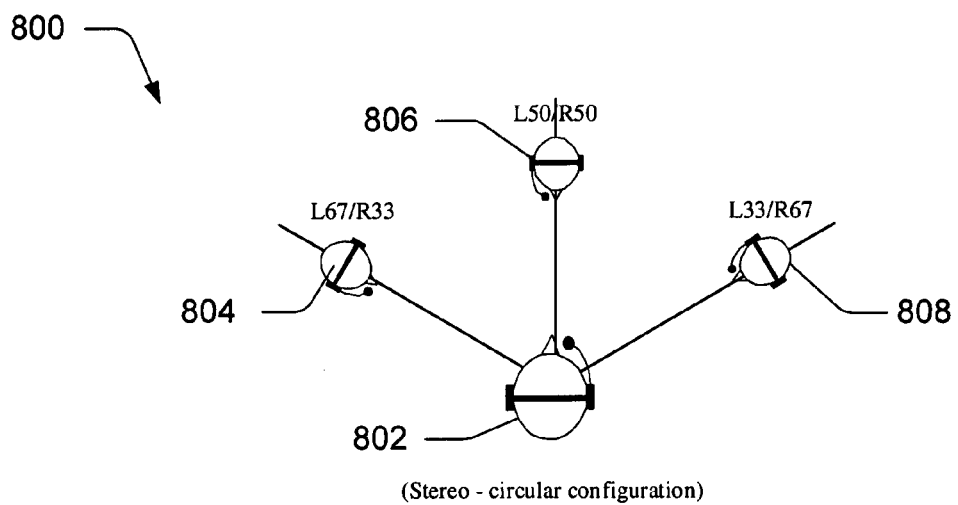
FIG. 8 is a schematic view of a group of participants surrounding a listener, utilizing the conference bridge of FIG. 7.

The SSAPC 702 may remove the "vacant" space (as shown in FIG. 6, element 610) by re-arranging the placement for each participant 404a-404d. Therefore, each participant will have his or her own placement within the sound field and may differ from each of the other participant's sound field configurations. FIG. 8 is a schematic view of a group of participants 800, where a listener 802 is placed in a sound field with other participants 804, 806, 808 in a SSAPC 700 with a separate listening bus for each participant.

Figure 9:
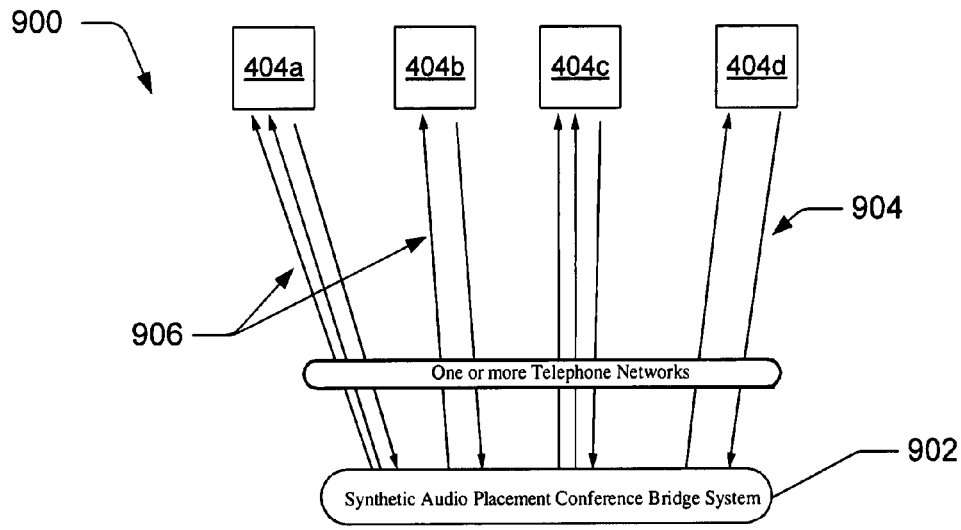
FIG. 9 is a schematic of yet another conference bridge for providing synthetic audio placement and how the conference bridge may be organized.

FIG. 9 is a schematic of yet another conference bridge 900, which depicts a network-based conference bridge configuration. For example, in this configuration, each participant connects to a centrally-located Synthetic Audio Placement Conference Bridge (SAPCB) 902.

With this configuration, each participant requires a single talk path 904, and a single or dual listening path 906, depending on whether or not the participant receives the synthetic audio placement capability. For example, this configuration may be offered by a conferencing service provider. Alterna-

TABLE 1

| Users | User 1 | User 2 | User 3 | User 4 | User 5 | User 6 | User 7 | User 8 | User 9 | User 10 |
|---|---|---|---|---|---|---|---|---|---|---|
| 2 | L 33% | L 67% | | | | | | | | |
|   | R 67% | R 33% | | | | | | | | |
| 3 | L 33% | L 67% | L 50% | | | | | | | |
|   | R 67% | R 33% | R 50% | | | | | | | |
| 4 | L 33% | L 67% | L 50% | L 10% | | | | | | |
|   | R 67% | R 33% | R 50% | R 90% | | | | | | |
| 5 | L 33% | L 67% | L 50% | L 10% | L 90% | | | | | |
|   | R 67% | R 33% | R 50% | R 90% | R 10% | | | | | |
| 6 | L 33% | L 67% | L 50% | L 10% | L 90% | L 41% | | | | |
|   | R 67% | R 33% | R 50% | R 90% | R 10% | R 59% | | | | |
| 7 | L 33% | L 67% | L 50% | L 10% | L 90% | L 41% | L 59% | | | |
|   | R 67% | R 33% | R 50% | R 90% | R 10% | R 59% | R 41% | | | |
| 8 | L 33% | L 67% | L 50% | L 10% | L 90% | L 41% | L 59% | L 22% | | |
|   | R 67% | R 33% | R 50% | R 90% | R 10% | R 59% | R 41% | R 78% | | |
| 9 | L 33% | L 67% | L 50% | L 10% | L 90% | L 41% | L 59% | L 22% | L 78% | |
|   | R 67% | R 33% | R 50% | R 90% | R 10% | R 59% | R 41% | R 78% | R 22% | |
| 10 | L 33% | L 67% | L 50% | L 10% | L 90% | L 41% | L 59% | L 22% | L 78% | L 45% |
|   | R 67% | R 33% | R 50% | R 90% | R 10% | R 59% | R 41% | R 78% | R 22% | R 55% |

FIG. 6 is a schematic view of a group of participants 600, where a listener 602 is placed in a sound field with other participants 604, 606, 608. In some embodiments, a conference will provide similar left and right sounds to the listener 602 as depicted in FIG. 6. For example, when participant 604 is speaking, the listener 602 may hear 67% of the speaker's sound in the listener's 602 left ear and 33% of the speaker's sound in the listener's 602 right ear, thus creating a balance effect to aurally locate the participant 604 to the left of the listener 602.

This configuration may allow the conference bridge 500 to use a single set of participant placements carried by the single listening bus 502. In this embodiment, the listener 602 may occupy a "vacant" location 610 in the array of participants 604, 606, 608 where the listener's 602 voice has been placed, and thus heard by the other participants 604, 606, 608 when the listener 602 is speaking.

Figure 7:
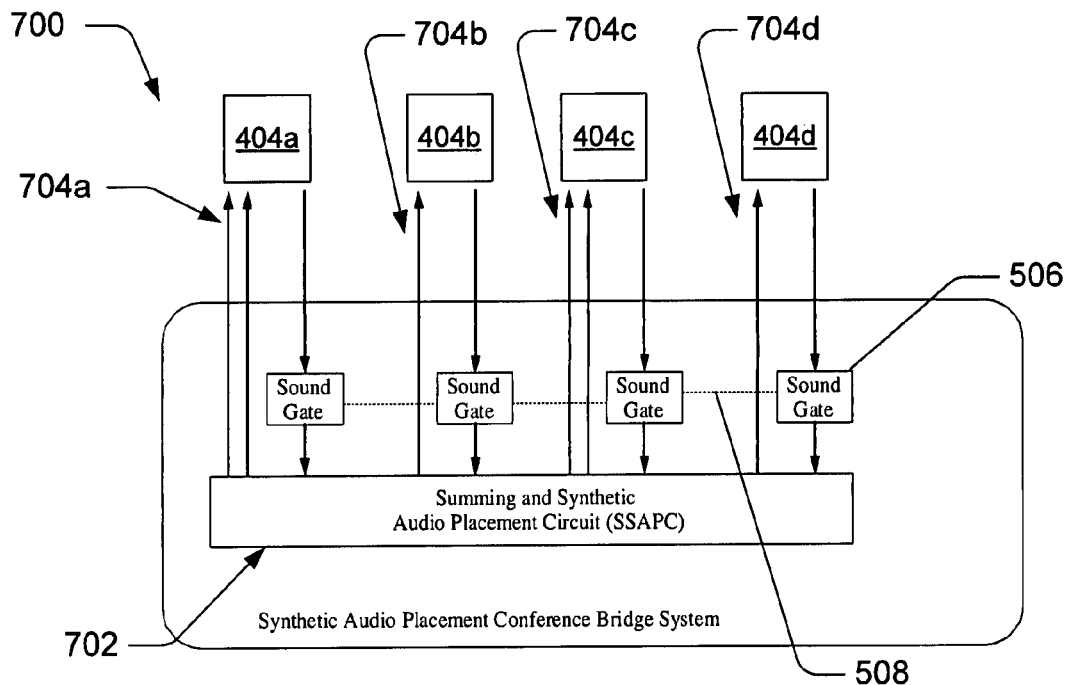
FIG. 7 is a schematic of another conference bridge including a separate listening bus for each participant.

FIG. 7 is a schematic of another embodiment of a conference bridge 700 including a separate listening bus for each participant 404a-404d. In these embodiments, a SSAPC 702 tively, the conferencing service provider may be one of the participants of the conference bridge 900.

Figure 10:
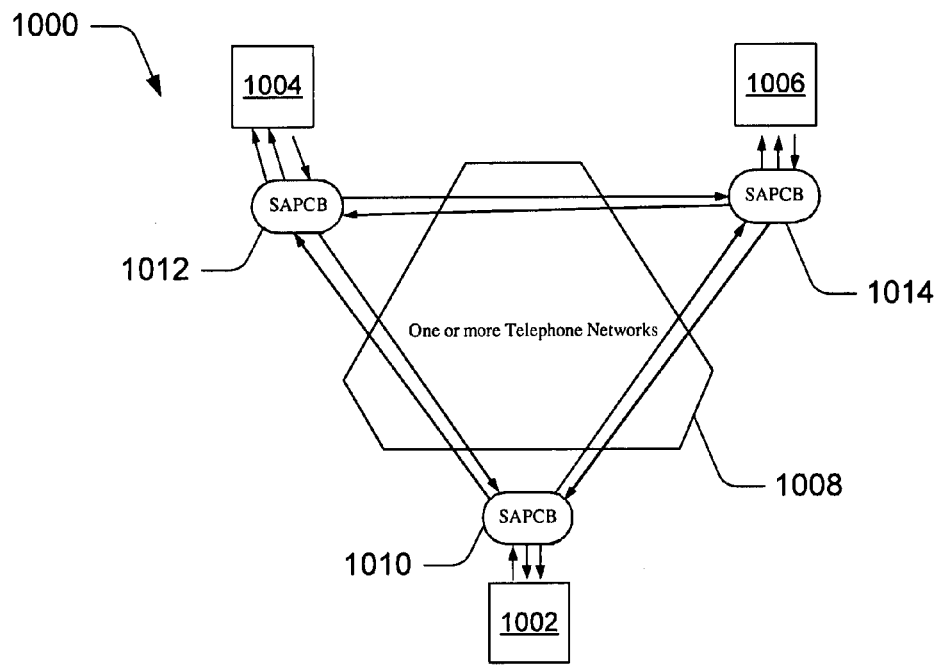
FIG. 10 is a schematic of a user-based conference bridge system for providing synthetic audio placement and how the conference bridge may be organized.

FIG. 10 is a schematic of a user-based conference bridge system 1000. In some embodiments, participants 1002, 1004, 1006 may operate their own conference bridge system 1010, 1012, 1014, respectively. This may result in a more complex network configuration 1008 than the configuration shown in FIG. 9, but it may be useful where the networks do not support the synthetic audio placement capability. Each participant may have to support multiple communication channels sufficient to support all conference participants.

In further embodiments of the disclosure, a distributed client server configuration, or other alternative configurations may be utilized to provide synthetic audio placement to a number of participants. For example, the bridge systems described above may be combined in part to provide some participants with their own independent bus while other participants may share a common bus.

Figure 11:
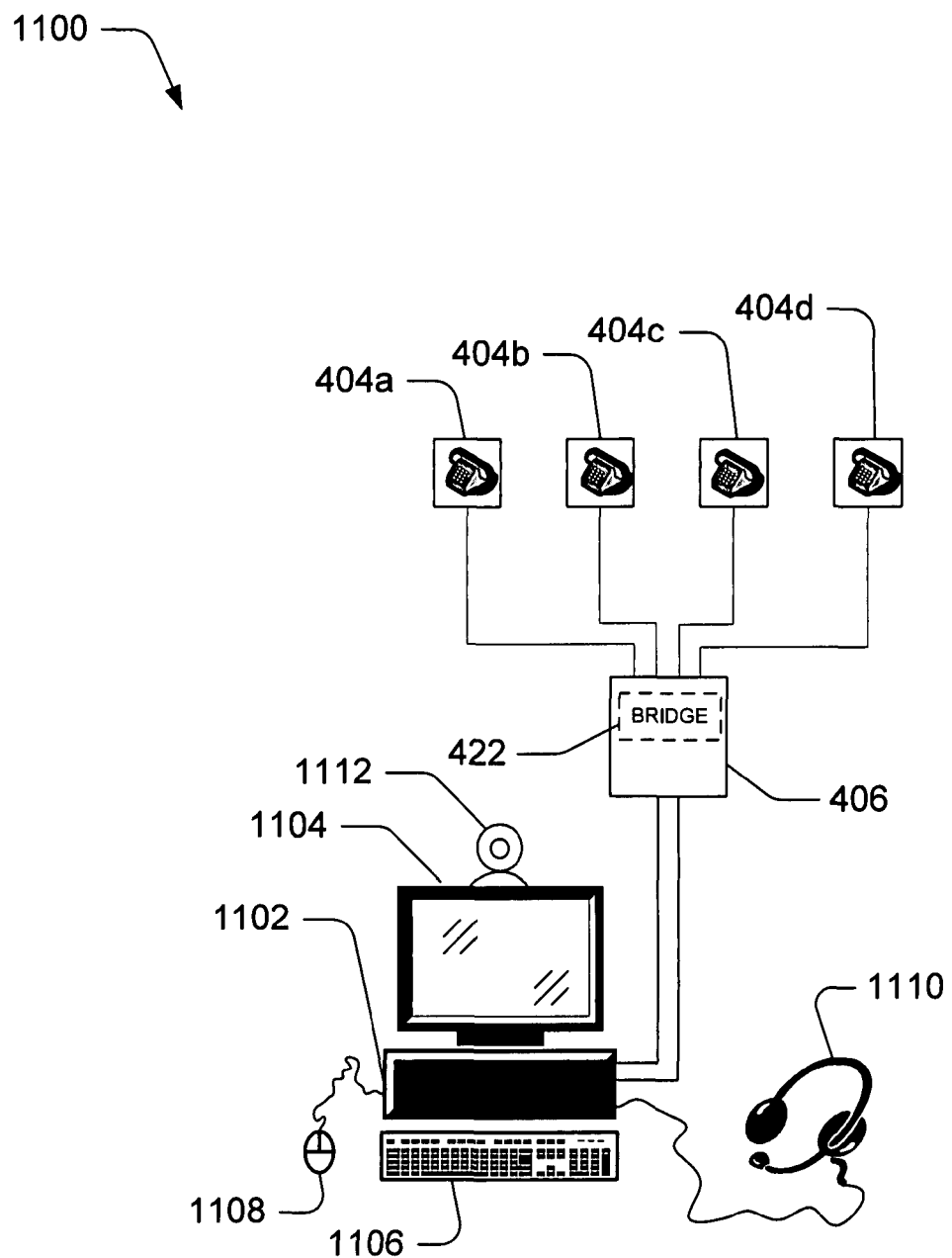
FIG. 11 is a schematic of systems for providing synthetic audio placement and how another system may be organized.

FIG. 11 is a schematic of a system 1100 for providing synthetic audio placement including a computing device 1102. The computing device 1102 contains modules to perform tasks to facilitate synthetic audio placement. For example, the computing device may include a monitor 1104, a keyboard 1106, a mouse 1108, a camera or other position sensor 1112, and a combined microphone input and speaker output 1110. Further aspects of the computing device 1102 are explained below.

Generally, any of the functions described herein can be implemented using software, firmware (e.g., fixed logic circuitry), analog or digital hardware, manual processing, or any combination of these implementations. The terms "module," "functionality," and "logic" generally represent software, firmware, hardware, or any combination thereof. In the case of a software implementation, the module, functionality, or logic represents program code that performs specified tasks when executed on processor(s) (e.g., any of microprocessors, controllers, and the like). The program code can be stored in one or more computer readable memory devices. Further, the features and aspects described herein are platform-independent such that the techniques may be implemented on a variety of commercial computing platforms having a variety of processors.

Methods and systems for providing synthetic audio placement in accordance with the teachings of the present disclosure may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 12:
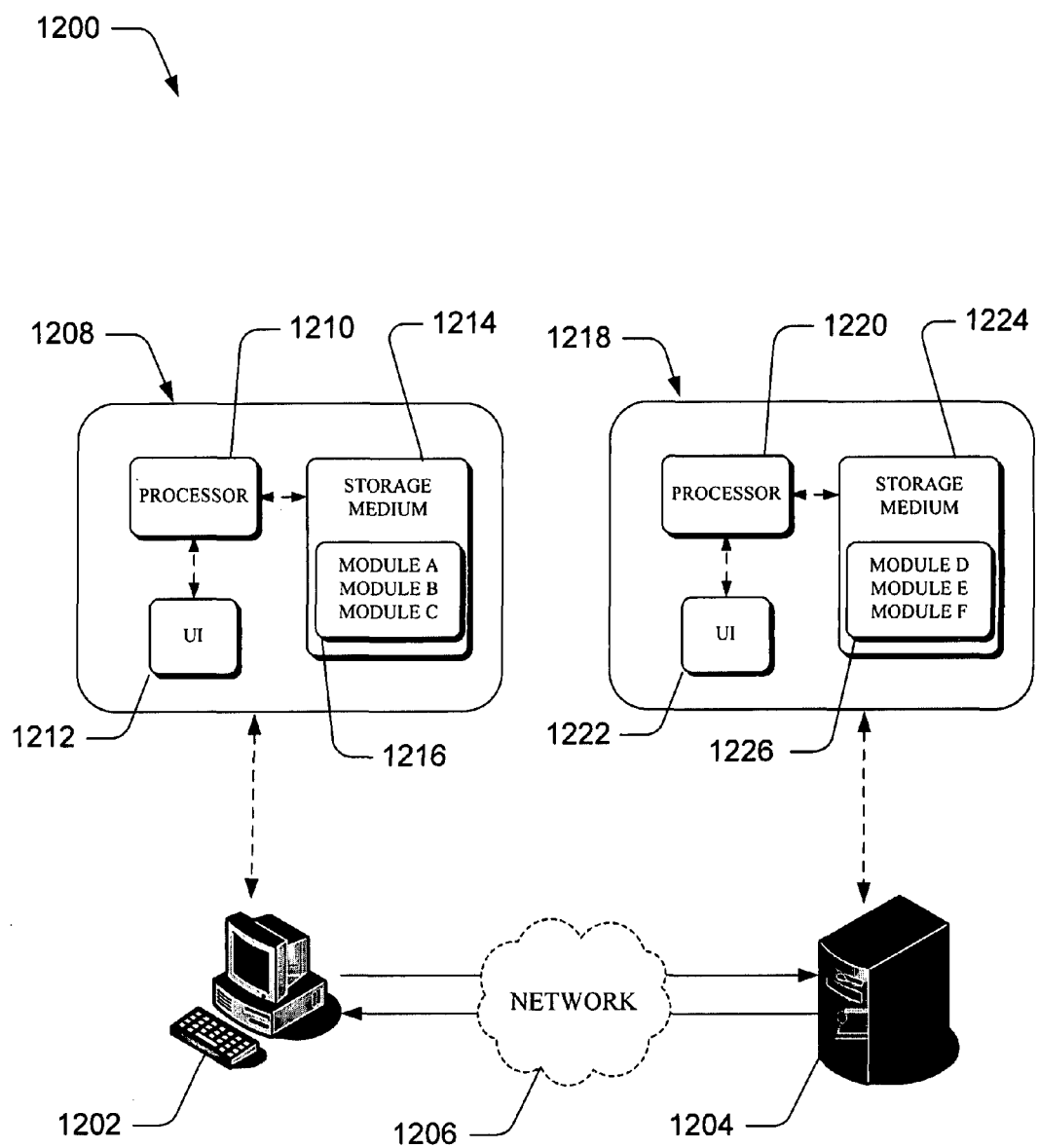
FIG. 12 is a schematic of an overall environment in which methods and systems of synthetic audio placement may be organized and how a network communication may be utilized.

FIG. 12 illustrates an overall environment 1200 in which computing devices interact to provide synthetic audio placement and how a network communication may be utilized. A first computing device 1202 may interact with a second computing device 1204 in connection by a network 1206. The computing devices 1202, 1204 may be a server; a desktop; a mobile, handheld, or laptop computer; a mobile telephone; a personal digital assistant (PDA); a multi-function device; or any other suitable computer-based device. Any type of wired or wireless network 1206 may connect the computing devices 1202, 1204. Wireless environments may include cellular, PCS, WIFI, Ultrawideband, Bluetooth, satellite transmission, and other equivalent wireless technologies. Wired or wireline environments may include cable communications and power line communications. In addition, traditional circuit-switched AIN network, packet-based networks, and network elements, such as Internet Protocol (IP) networks and elements may be configured to facilitate communications between the computing devices 1202, 1204. FIG. 12 depicts two computing devices 1202, 1204 for convenience only, but it is noted that the environment 1200 may support any number of computing devices 1202, 1204 in connection by one or more networks 1206.

The first computing device 1202 may include a number of components 1208. These components 1208 may include one or more processors 1210 that are coupled to instances of a user interface (UI) 1212. The UI 1212 represents any devices and related drivers that enable the computing device 1202 to receive input from a user or other system, and to provide output to the user or other system. Thus, to receive inputs, the UI 1212 may include keyboards or keypads, mouse devices, touch screens, microphones, speech recognition packages, imaging systems, or the like. Similarly, to provide outputs, the UI 1212 may include speakers, display screens, printing mechanisms, or the like.

The computing device 1202 may include one or more instances of a computer-readable storage medium 1214 that are addressable by the processor 1210. As such, the processor 1210 may read data or executable instructions from, or store data to, the storage medium 1214. The storage medium 1214 may contain a number of modules 1216, such as modules A, B, C, which may be implemented as one or more software modules that, when loaded into the processor 1210 and executed, cause the computing device 1202 to perform any of the functions described herein, such as to provide synthetic audio placement in accordance with embodiments of the present disclosure. Additionally, the storage medium 1214 may contain implementations of any of the various software modules described herein. In some embodiments, the first computing device 1202 is connected to the communication system 406 in FIG. 4 and exchanges communications from the listener 104 and the participants 404a-404d.

As previously described, the second computing device 1204 is in communication with the first computing device 1202 through the network 1206. The second computing device 1204 may include a number of components 1218. The second computing device 1204 may include one or more processors 1220 that are coupled to instances of a user interface (UI) 1222. The UI 1222 represents any devices and related drivers that enable the second computing device 1204 to receive inputs from a user or other system, and to provide outputs to the user or other system. The second computing device 1204 may include one or more instances of a computer-readable storage medium 1224 that are addressable by the processor 1220. As such, the processor 1220 may read data or executable instructions from, or store data to, the storage medium 1224. The storage medium 1224 may contain a number of modules 1226, such as modules X, Y, Z, which may be implemented as one or more software modules that, when loaded into the processor 1220 and executed, cause the second computing device 1204 to perform any of the functions described herein, such as to provide synthetic audio placement. Additionally, the storage medium 1224 may contain implementations of any of the various software modules described herein.

In some embodiments, the second computing device 1204 may be the communication system 406 as shown in FIG. 4. The second computing device 1204 may receive data from the first computing device 1202 related to communications between a listener and participants 404a-404d. In other embodiments, the second computing device 1204 may connect to the communication system 406.

Figure 13:
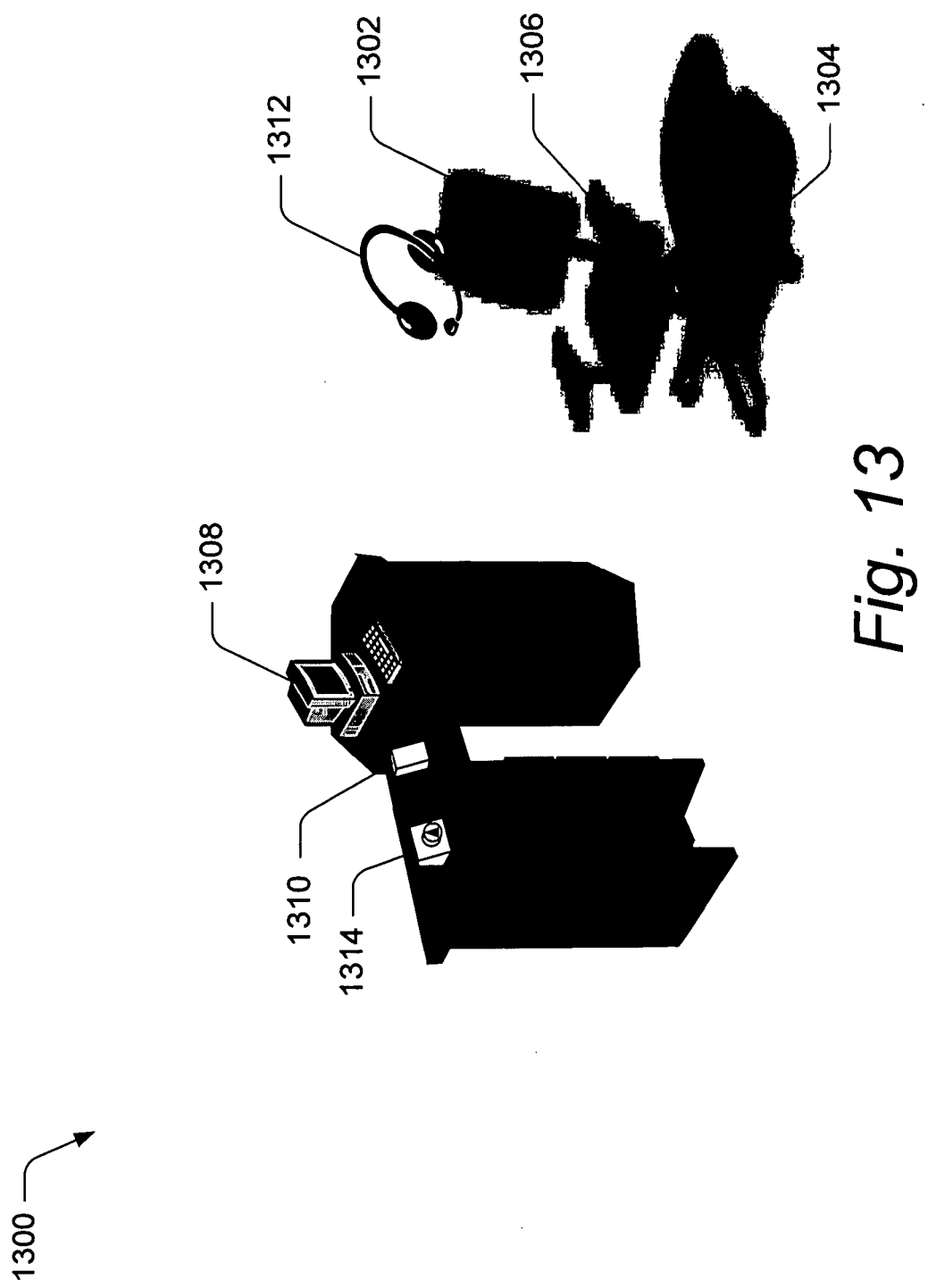
FIG. 13 is a schematic of methods and systems for providing synthetic audio placement and how a listener may focus on a participant during a conference.

FIG. 13 is a schematic of an environment 1300 for providing synthetic audio placement and how a listener may focus on participants during a conference. The environment 1300 may include a chair 1302 that may be configured with a number of sensors to detect the movement of the listener, such as listener 104 in FIG. 1, and thus change the focus of the listener within the sound field 122.

For example, in some embodiments, the chair 1302 may include a swivel sensor 1304 that senses rotational motion of the chair (e.g., swiveling) to adjust the focus within the sound field 122. For example, when the listener 104 sits in the chair 1302 and activates the swivel sensor 1304, such as by selecting the swivel sensor 1304 in method 300 at the block 334 in FIG. 3, the focus may change in the sound field 122 when the listener 104 rotates the chair 1302, and thus the swivel sensor 1304. The swivel sensor 1304 may be configured to controllably adjust the focus within the sound field 122 with corresponding rotational movement, such as a ninety (90) degree rotation of the chair 1302 and swivel sensor 1304 may result in a ninety (90) degree rotation of the sound field 122 with respect to the listener 104. In other embodiments, the rotation of the swivel sensor 1304 may result in greater or less rotation of the focus within the sound field 122 with respect to the listener 104. The chair 1302 may also have additional sensors to change the focus based on movements by a listener 104. For example, the chair 1302 may include an armrest sensor 1306, or other sensors that detect the position of the listener 104 to change the focus within the sound field 122.

The various sensors on the chair 1302, such as the swivel sensor 1304, armrest sensor 1306, or other listener sensors may be in communication with the processing device 402, or a computing device 1308. In other embodiments, the sensors on the chair 1302 may be in communication with a receiver 1310. The receiver 1310 may be in connection with the processing device 402 in FIG. 4 or the computing device 1308 to process the signal received by the sensor on the chair 1302. In some embodiments, the swivel sensor 1304 or the armrest sensor may detect a signal from a user input (i.e., movement of the user on the chair 1302), and then send a signal to the receiver 1310. The receiver may process the signal and transmit the processed signal to the computing device 1308 which determines the direction and degree of swivel or user movement from the signal and then changes the focus within the sound field. The communications between sensors, the receiver 1310, and the processing device 402 or computing device 1308 may be wired connections, wireless connections, or a combination of both. A wireless connection may include WiFi, Ultrawideband, Bluetooth, or others. A wired connection may include USB, coaxial, or other wired connections.

The environment 1300 may also include wearable speakers 1312. In some embodiments, the wearable speakers 1312 may be stereo headphones. In other embodiments, the speakers may be integrated in other forms as wearable speakers. The wearable speakers 1312 may include a device to detect the orientation of a listener 104. For example, the wearable speakers 1312 may be in wired or wireless communication with the receiver 1310, the processing device 402, or the computing device 1308 to sense movements of the listener's 104 head. The receiver may utilize Bluetooth or other wireless communications to interact with the wearable speakers 1312, such as those previously described. In an example operation, if the listener is facing the receiver 1310, then the listener may be orientated in a first position within the sound field 122. If the listener moves to a second position (such as by turning his head), as detected by the receiver 1310 from movement (e.g., rotation) of the wearable speakers 1312, then the listener 104 may be orientated in a second position within the sound field 122. In other embodiments, the receiver 1310 may detect the movement or orientation of other wearable devices. The movement or orientation may be detected utilizing motion detectors, gravity based sensors, or other movement detection devices, including physical, electronic, and image based detection devices.

In additional embodiments, the environment 1300 may include a manual control device 1314 to adjust the focus. The manual control device 1314 may be a rotating knob that allows the listener 104 to rotate the knob and change the orientation of the sound field 122. For example, the manual control device 1314 may perform the method 300 as described in the block 332 in FIG. 3.

In further embodiments, the computing device 1308 may be utilized to control one or more of the devices in environment 1300, such as the receiver 1310 or the manual control device 1314. In some embodiments, the receiver 1310 or the manual control device 1314 may be integrated into the computing device 1308. The computing device 1308 may have a Bluetooth wireless receiver to receive communications from a transmitting Bluetooth enabled device, such as the swivel sensor 1304, the armrest sensor 1306, and the wearable speakers 1312. Additionally, the computing device 1308 may include manual controls through a user interface, such as keys on a keyboard designated to adjust the focus within the sound field 122 based on the listener's 104 adjustments.

Figure 14:
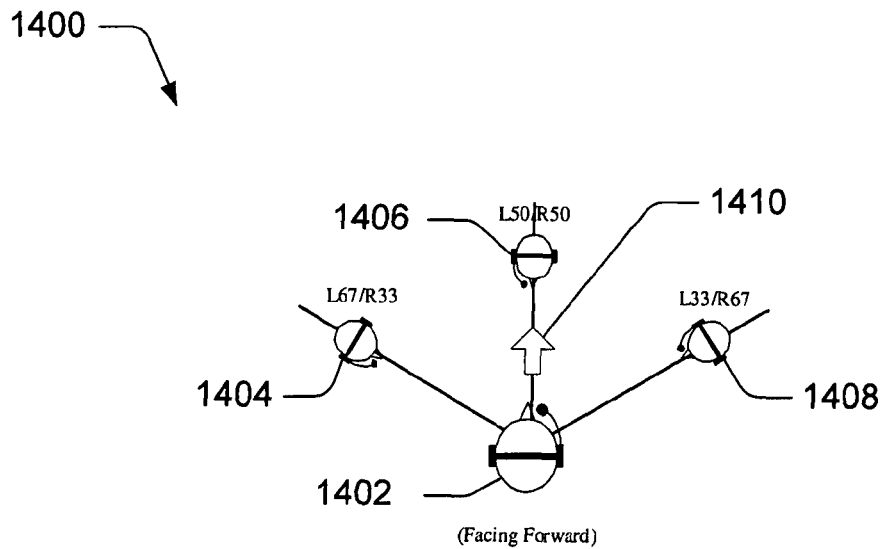
FIG. 14 is a schematic of a listener placed in a sound field with sensor based synthetic audio placement with other participants, where the listener is facing a first direction.
Figure 15:
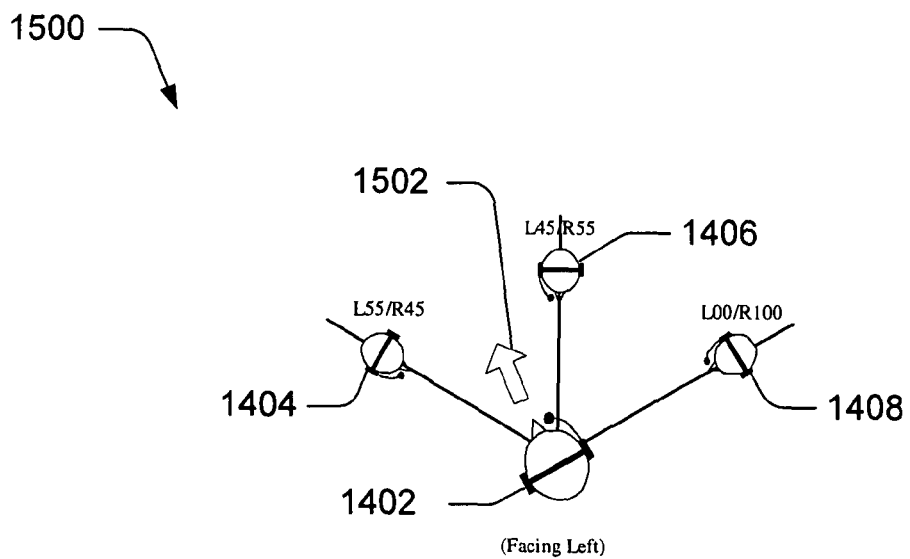
FIG. 15 is a schematic of a listener placed in a sound field with sensor based synthetic audio placement with other participants, where the listener is facing a second direction.

FIGS. 14 and 15 are schematics of a group of participants 1400 and 1500, respectively, where a listener 1402 is placed in a sound field with sensor-based synthetic audio placement with other participants 1404, 1406, 1408. FIG. 14 depicts the listener 1402 directing his or her attention at participant 1406, as detected by a sensor, such as those described above in FIG. 13. FIG. 15 depicts the listener 1402 directing his or her attention to participant 1404, and thus changing the perceived aural placement of the participants in the sound field.

In an example, the listener 1402 utilizes wearable speakers 1308 as shown in FIG. 13. In operation, the listener 1402 may be on a conference call with the participants 1404, 1406, 1408. As shown in FIG. 14, the listener 1402 may have a focus direction 1410 within the sound field on speaking participant 1406 and hear substantially equal volume sound through both a left speaker and a right speaker. Next, the participant 1404 may begin speaking. The listener 1402 may initially hear the participant 1404 primarily in the left speaker while the focus remains unchanged in the sound field.

The listener 1402 may then change the focus direction to a focus direction 1502, as shown in FIG. 15, within the sound field. For example, the listener 1402 may utilize manual devices or sensors described in environment 1300 in FIG. 13, and direct the focus direction 1502 on the participant 1404 that is speaking. As shown in FIG. 15, after the listener 1402 changes the focus, the sound field may correspondingly change to reflect the new sound field orientation, thus providing more balanced left and right sound volume. Next, the participant 1408 may begin speaking. In the current sound field orientation shown in FIG. 15, the participant 1408 that is now speaking will sound as if the speaker were located behind the listener 1402 until the listener 1402 changes the focus direction 1502.

Figure 16:
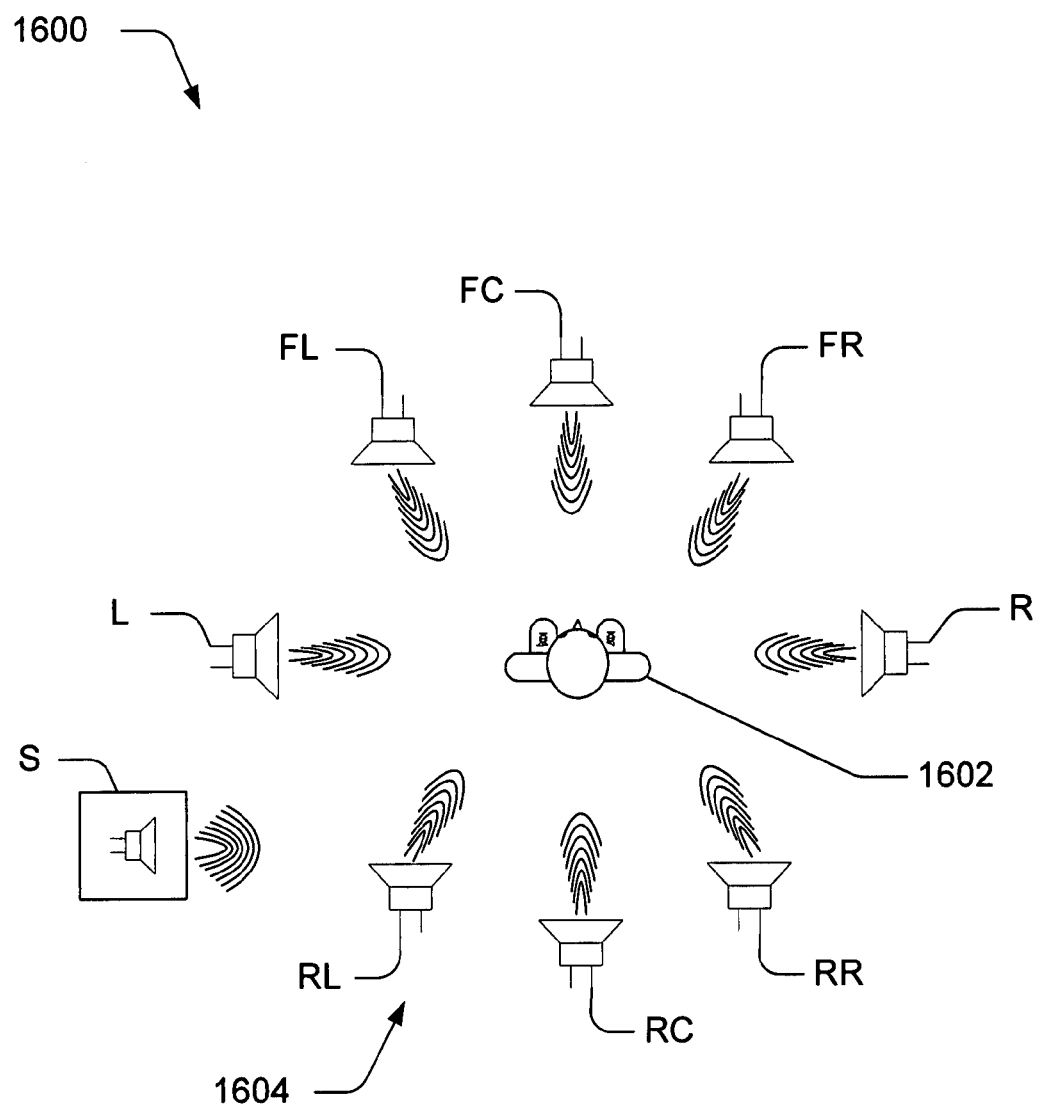
FIG. 16 is a schematic of methods and systems for providing synthetic audio placement and how an audio output may be configured for a listener.

FIG. 16 is a schematic of an environment 1600 for providing synthetic audio placement and how an audio output may be configured for a listener 1602. The environment 1600 includes the listener 1602 and a plurality of speakers 1604. The speakers 1604 may be arranged in any number of configurations. For example, the speakers 1604 may be configured with a 5.1, 6.1, or 13.1 multi-channel audio system, whereas one subwoofer S is placed with five, six, or seven speakers, respectively. In the most basic configuration, the environment 1600 may only include a left speaker L and a right speaker R. In other embodiments, a plurality of speakers may be distributed around the listener 1602 in a surround-sound configuration, such as with individual speakers placed in the front center FC, front right FR, right R, rear right RR, rear center RC, rear left RL, left L, and front left FL positions.

An example operation of adjusting the focus within a sound field will now be presented for exemplary purposes in accordance with some configurations of methods and systems for providing the synthetic audio placement. In the environment 1600 shown in FIG. 16, the listener 1602 may be on a conference with three participants, such as the participants 104, 106, 108 in FIG. 1. A speaker configuration may surround the listener 1602, such as speakers 1604 arranged around the perimeter of the listener 1602. When the participants 104, 106, 108 enter the conference, such as by method 200, the participants are placed in a sound field that may correspond to the speakers 1604. For example, participant 104 may be projected in the sound field location corresponding to speaker L, participant 106 may be projected in the sound field location corresponding to speaker FC, and participant 108 may be projected in the sound field location corresponding to speaker R. The participant 106 may be the focus of the listener 1602, and thus projected through speaker FC. Next, participant 104 may begin speaking. The listener may hear participant 104 primarily from speaker L, with additional sound projected through speakers RL and FL. Therefore, the single channel signal detected by the microphone utilized by participant 104 is modified to create a synthetic audio placement when received by the listener 1602. Alternatively, the speakers 1604 may be used in a similar way as they are used in a conventional theatre and other sound systems, in which they create a realistic sound field for the synthesized audio placement, with echo and simulated room acoustic characteristics.

A conference may include any number of participants and listeners. Therefore, one or more listeners may participate in a conference utilizing the synthetic audio placement speaker system as described herein. In some embodiments, each listener may control the focus within the sound field for that listener's audio output, therefore allowing each participant to control the focus within their own sound field. In other embodiments where multiple listeners utilize the methods and systems described herein, a portion of the listeners may share a common sound field and have a common focus within the shared sound field.

Figure 17:
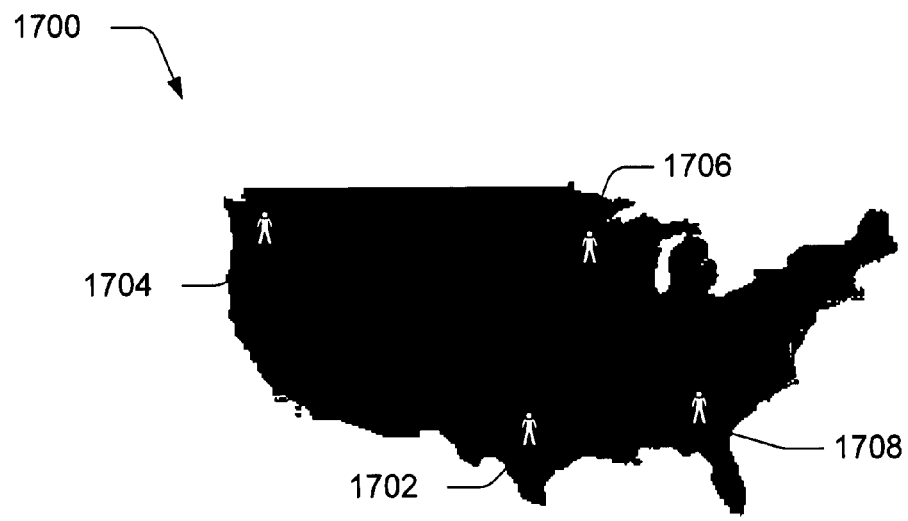
FIG. 17 is a schematic of a geographic sound field 1700 configuration in accordance with the disclosure.

FIG. 17 is a schematic of a geographic sound field 1700 configuration in accordance with the disclosure. Within the geographic sound field 1700, a listener 1702 is placed with participants 1704, 1706, 1708, each having a respective geographic location. For example, the listener 1702 may be in Dallas and the participants 1704, 1706, 1708 may be in Seattle, Minneapolis, and Atlanta, respectively. When the listener 1702 hears one of the participants 1704, 1706, 1708 with synthetic audio placement as disclosed above, the participant will be heard as if placed in the geographic sound field 1700 in accordance with the participant's geographic location. For example, when participant 1704 is speaking, the listener 1702 may hear the participant 1704 as if located to the upper left (i.e., northwest) of the listener. Geographic determination may be based on geo-location technologies such as a Global Positioning Satellite system, or on the caller's telephone number, Internet Protocol address, or other network-based geo-location information. The listener may also manually assign a geographic location to one or more participants on a temporary or permanent basis, stored in an address book or other database.

In some embodiments, the user may select a distribution appropriate for the geographic locations of the participants. For example, if there are two participants in New York, one in Chicago, and one in Los Angeles, and a Proportional distribution is utilized, the LA participant may be positioned far left, the Chicago participant in the center, and the NY participants near right and far right, respectively. Additionally, an Equidistant distribution may be utilized where the participants may be placed evenly across the sound field as described above in Table 1. An Actual distribution may also be utilized where the participant distribution may resemble the Proportional distribution, except that the two NY participants will appear to be positioned in the same, far right position. Each distribution has its own particular advantages which depend on the locations of the participants, and the listener's needs. A default distribution may also be automatically selected based on geographic locations. The preceding distribution explanation is based on a virtual listener location in the south-central part of the United States. In further embodiments, the listener may select a virtual location for the listener that best meets the listener's needs. For example, the listener may choose to be virtually placed in the center of all participants, or on a northern, southern, eastern, or western periphery. Furthermore, the listener may select a virtual direction to face. An example listener located on the south-central periphery was facing north, hence LA is on the left, and NY on the right. The listener may also select the facing direction to vary depending on the focus or the loudest speaker.

Figure 18:
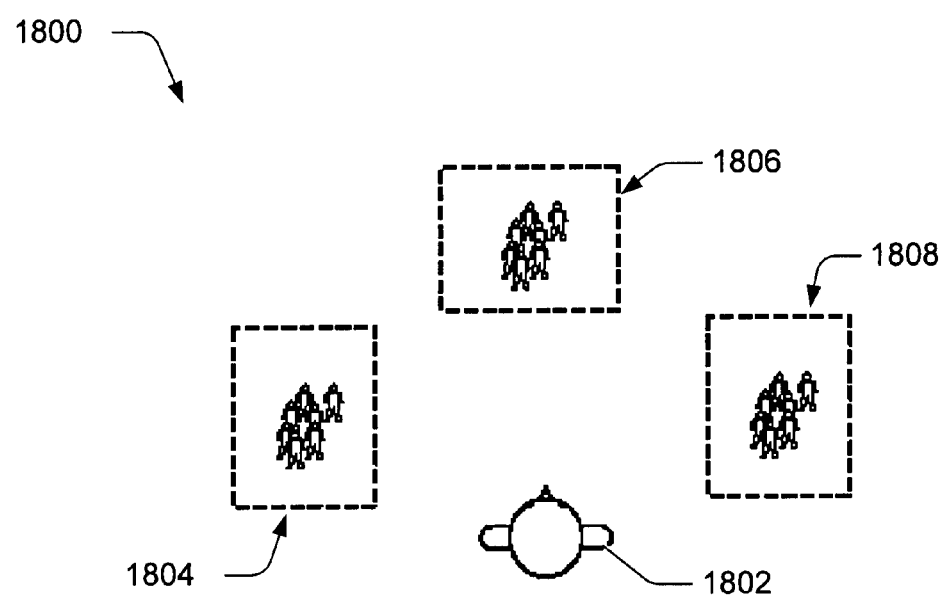
FIG. 18 is a schematic of a group sound field configuration in accordance with the disclosure.

FIG. 18 is a schematic of a group sound field 1800 configuration in accordance with the disclosure. Within the group sound field 1800, a listener 1802 is placed with participant groups 1804, 1806, 1808. The participant groups 1804, 1806, 1808 may be groups of participants with similar attributes. For example, the participants in the group 1804 may work for the same company or be members of the same team. The participants may make a selection when joining the call (e.g., press "1" for company A, etc.). Participants may also be numbered for the purpose of arranging them in groups. The numbers may correspond to a job level or other distinction which can be represented in a numerical relationship. For example, company officers may be numbered 1.1, 1.2, 1.3, company executives 2.2, 2.2, 2.3, company directors 3.1, 3.2, 3.3, and company staff 4.1, 4.2, 4.3. In some embodiments, the listener may optionally select an ordering of numbered groups, such that the lowest-numbered participants are placed in the center, or on the left, or on the right, depending on the listener's preferences or needs. Further, the listener may reposition an entire group of participants from their default location to another location.

FIGS. 19a-19c include schematics of sample default configurations for a listener and participants within a sound field in accordance with the disclosure. FIG. 19a includes a circular sound field 1900a with participants arranged in a circular configuration. FIG. 19b includes a polygon sound field 1900b with participants arranged around the perimeter of the polygon. FIG. 19c includes a presentation sound field 1900c with participants arranged in an audience configuration orientated towards a speaker. FIGS. 19a-19c are demonstrative of exemplary default configurations of methods and systems of synthetic audio placement. One should appreciate that other default configurations may be included and still remain within the spirit and scope of the disclosure.

FIG. 20 is a block diagram of an exemplary method 2000 of placing participants within a sound field using synthetic audio placement. At a block 2002, the method 2000 begins. At a decision block 2004, a listener selects a sound field configuration via routes A, B, C, or D. The sound field configurations may include be based on geographic location at a block 2006, group, membership, or ordered (numbered) ranking at a block 2008, default configurations at a block 2010, and a manual configuration at a block 2012.

At the block 2006, the participants are placed in a sound field as summarized above in FIG. 17. For example, at the block 2006 the listener may adjust the sound field by selecting the desired distribution of the participants and location of the listener. Once the participants are placed geographically at the block 2006, the method 2000 advances to a block 2014 and ends. At the block 2008, the participants are placed in a sound field as explained above in FIG. 18. After the participants are placed by group, membership, or order at the block 2008, the method 2000 advances to the block 2014 and ends.

At the block 2010, the participants are placed in a sound field by selecting from a number of default configurations, such as those presented in FIG. 19*a*-19*c*. At a block 2016, a user may select the default configuration desired for placing participants within a sound field, such as those presented in configurations 1900*a*, 1900*b*, and 1900*c*. At a decision block 2018, the user may select to adjust the position of an individual participant within the selected default configuration. For example, the user may want to move a participant from the left side of the selected default configuration to the right side of the selected default configuration, without changing the synthetic positions of other participants. At a block 2020, the user selects a participant to move. At a block 2022, the user places the participant. At a decision block 2024, the user may repeat the process at the block 2020. If the user does not select to repeat the process, at the block 2014 the method ends. Returning back to the decision block 2018, if the user does not select to move a participant, at the block 2014 the method ends.

At the block 2012, the user may manually place participants within a sound field. For example, the user may want to design a unique sound field configuration that is not included in the default configuration in the block 2010. At a block 2026, the user selects a participant to move. At a block 2028, the user places the participant. At a decision block 2030, the user may repeat the process at the block 2026. If the user does not select to repeat the process, at the block 2014 the method ends. The user may move participants using user controls to place the participants in the desired location within a sound field. In some embodiments, the user may move a participant with a dial or joystick on a processing device. In other embodiments, a touch screen, mouse, or other user interface method may allow a user to place a participant within the sound field.

It is noted that the various modules shown herein may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

Although techniques for providing synthetic audio placement have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A system of providing synthetic audio placement comprising:
  a connection port to receive a plurality of remote audio signals included in a conference call, at least one of the plurality of remote audio connections being a single channel audio signal;
  a processor configured with the connection port to provide a sound field for placing the plurality of remote audio signals, the sound field providing synthetic audio placement of each of the plurality of remote audio signals within the sound field at a respective location in a substantially presentation configuration towards a listener, wherein the presentation configuration comprises an audience configuration of spaced-apart rows of the plurality of remote audio signals oriented towards the listener; and
  a rendering output configured with the processor to project the plurality of remote audio signals within the sound field to the listener, such that the listener can hear the plurality of remote audio signals from respective locations within the sound field.

2. The system of claim 1, further comprising:
  an input device configured with the processor to receive an orientation signal from the listener, the orientation signal transmitted to the processor to modify the sound field for the plurality of remote audio signals.

3. The system of claim 2, wherein the processor is a computer.

4. The system of claim 1 further comprising a communication bridge in connection between the connection port and the processing module.

5. A method of providing synthetic audio placement comprising:
  receiving an incoming signal over an audio connection, the incoming signal including audio input from a plurality of audio sources, the incoming signal not including information regarding relative positions of the plurality of audio sources;
  synthesizing a sound field having a synthetic position associated with each of the plurality of audio sources relative to a listener, wherein the synthetic position includes arranging the plurality of audio sources in a substantially presentation configuration towards the listener, and wherein the presentation configuration comprises an audience configuration of spaced-apart rows of the plurality of audio sources oriented towards the listener;
  processing a portion of the incoming signal, including:
    determining which one of the plurality of audio sources provided the portion of the incoming signal;
    determining the synthetic position associated with the one of the plurality of audio sources including selecting an audio source that is to be a focus of the listener and amplifying a volume level of the audio source selected to be the focus of the listener above a volume level of other audio sources;
    changing a volume level within the sound field of all audio sources not selected as being the focus of the listener such that no one audio source is louder than the others and such that no one audio source is fainter than the others;
    generating a synthesized audio signal based on the portion of the incoming signal and the determined synthetic position of the one of the plurality of audio sources, the synthesized audio signal being configured to at least partially provide the listener with a sense of having a relative position with respect to the one of the plurality of audio sources; and
    emitting the synthesized audio signal to the listener.

6. The method of claim 5, wherein determining the synthetic position associated with the one of the plurality of audio sources includes determining an orientation of the listener.

7. The method of claim 5, wherein determining the synthetic position associated with the one of the plurality of audio sources includes receiving a locating input for locating at least one of the plurality of audio sources within the sound field.

8. The method of claim 5, wherein the focus is provided by processing a signal from a manual listener control, the manual listener control configured to receive a listener focus input.

9. The method of claim 5, wherein the focus is provided by processing a signal from a sensor, the sensor configured to monitor movements of the listener.

10. The method of claim 9, wherein the sensor includes a motion detector to sense the spatial movement of the listener.

11. The method of claim 5, wherein generating the synthesized audio signal includes adjustably controlling the volume of each of the plurality of audio sources.

12. The method of claim 5, wherein emitting the synthesized audio signal includes emitting the synthesized audio signal in two channel stereo sound.

* * * * *